United States Patent
Mathews et al.

(10) Patent No.: US 6,233,652 B1
(45) Date of Patent: May 15, 2001

(54) TRANSLATION LOOKASIDE BUFFER FOR MULTIPLE PAGE SIZES

(75) Inventors: Gregory Scott Mathews, Santa Clara; Jarvis Leung, Fremont, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/183,685

(22) Filed: Oct. 30, 1998

(51) Int. Cl.[7] .................................................. G06F 12/10
(52) U.S. Cl. .............................. 711/108; 711/5; 711/101; 365/49; 365/50; 365/202; 365/206; 365/212
(58) Field of Search ................................. 711/104, 108, 711/202, 203, 205, 206, 207, 5, 101, 201–209, 212; 365/49, 50

(56) References Cited

U.S. PATENT DOCUMENTS

| | | | |
|---|---|---|---|
| 5,491,806 | * | 2/1996 | Horstmann et al. .................. 711/207 |
| 5,526,504 | * | 6/1996 | Hsu et al. ............................. 711/207 |
| 5,546,555 | * | 8/1996 | Horstmann et al. .................. 711/207 |

* cited by examiner

*Primary Examiner*—Than Nguyen
(74) *Attorney, Agent, or Firm*—David Kaplan

(57) ABSTRACT

The invention provides for a content addressable memory (CAM). The CAM includes an input port and a plurality of locations to store page addresses for comparing to an address received from the input port. Each location includes a plurality of lower cells and at least one page size mask cell to send signals to an associated one of the lower cells. The associated one of the lower cells produces a match signal in response to either the page size cell sending a mask signal or to the portion page address stored therein matching a corresponding portion of the address received from the input port. Each location produces a match signal in response to each cell therein producing a match signal. The invention provides for a method of translating logical to physical addresses. The method includes comparing a input logical address to a plurality of stored page logical addresses and sending a match signal to a data array in response to a portion of the input logical address matching one of the stored page logical addresses. The stored page logical addresses have a plurality of lengths. The method also includes transmitting a physical address to an output line in response to the data array receiving a match signal for a corresponding page logical address.

20 Claims, 18 Drawing Sheets

TRANSLATION LOOKASIDE BUFFER FOR MULTIPLE PAGE SIZES

BACKGROUND OF THE INVENTION

1. Field of the Invention

This invention relates generally to computers and memory devices, and more particularly, to apparatus and methods for translating logical addresses to physical addresses.

2. Description of the Related Art

A computer or processor accesses memory locations to load or store data. To access memory, the processor uses the physical address (PA) of the data in the memory. The PA at which data is stored in a memory is not the address that a processor uses to index the data during internal manipulations. The processor hardware will assign a logical address (LA) to data being processed by instructions. The LA's and PA's are usually assigned differently so that data manipulations and memory use can both be optimized. Thus, memory accesses entail translating LA's to PA's.

A physical memory is a collection of memory pages or blocks. The PA of a memory location is given by the page address and the relative address of the memory location on that page. Typically, only the LA's of "pages" undergo translation. Relative addresses of memory locations on a page are assigned in the same way in the memory and internally in the processor.

A memory is organized a collection of pages. For example, a memory having $2^{32}$ memory locations can be organized as $2^{20}$ pages of $2^{12}$ locations per page, i.e., page size of 4,056, or as $2^{12}$ pages having $2^{20}$ locations per page, i.e., page size of about $10^6$. Since the number of memory pages depends on the page size, the number of bits in the LA of a page depends on the page size.

FIG. 1 shows an address translator 10 of the prior art. A logical address generation unit 12 generates the LA for the memory location to be accessed. Here, the LA's are 32-bits long, because the computer has $2^{32}$ memory locations. Line 13 transmits bits 31 to 12 of an LA, i.e., the LA of a page, to a paging unit 14 for translation. The paging unit 14 includes well-known hardware, ie., tables, for translating the LA's of pages to PA's of pages. A line 15 transmits the PA of the page to be accessed to a cache memory 16. A line 17 transmits bits 0 to 11 of the LA, i.e., the relative position of the memory location to be accessed on the page, from the logical address generation unit 12 to the cache memory 16 without translation. The translator 10 sends the entire PA of a memory location to be accessed to the cache memory 16, but only page addresses are translated. The translation of LA's to PA's by the paging unit 14 can be slow, because the paging unit 14 uses large page tables (not shown), which are usually stored in memory.

Referring to FIG. 1, the translator 10 includes a translation lookaside buffer (TLB) 18 for translating recently accessed page LA's. The TLB 18 is organized similar to a cache memory. The small size of the TLB expedites the translation of page LA's stored therein. A line 19 transmits a page LA from the logical address generation unit 12 to the TLB 18. If the LA matches an entry of the TLB 18, the TLB transmits the corresponding PA to the cache 16 via line 23, i.e., a TLB hit. The TLB 18 also disables the paging unit 14 in response to a TLB 18 hit. If the LA from the line 19 does not match an entry of the TLB 18, the slow paging unit 14 translates the LA.

Different considerations may favor either smaller or larger page sizes. Since computers frequently load entire pages into active memory, small page sizes may enable more efficient use of small active memories. Since properties such as the cacheability, writeability, and privilege levels of memory locations are often assigned to whole pages, smaller pages enable finer granularity for defining these properties. On the other, large pages use less memory to store page properties. Furthermore, large tables have shorter LA's that need less memory space used for page tables and less time to translate page LA's into PA's. The use of only one page size may not enable optimizing these conflicting advantages.

To profit from these advantages, one prior art computer employs two pages sizes and a separate TLB (not shown) for each page size. Since TLB's are memory storage devices, TLB's use substantial hardware. Employing two TLB's may represent a significant cost in terms of chip area. Furthermore, processor's employing a separate TLB for each page size may not perform translations efficiently when the vast majority of recently accessed pages have one size.

FIG. 2 illustrates second prior art translator 26 for pages of more than one size. The TLB 28 stores data indicating the sizes of the pages corresponding to addresses stored therein. The TLB 28 and the paging unit 14 transmit translated addresses via lines 23, 15 to first data inputs of first and second multiplexers (MUX) 32, 34, respectively. Lines 33, 35 transmit a portion of the LA from the logical address generation unit 12 to second data inputs of the multiplexers 32, 34.

Still referring to FIG. 2, different bits of a LA are translated to a page PA for different page sizes, because only the "page" portion of the LA is translated. For the above-described 4 giga-byte memory and pages of sizes 4,056, 8,112, and 32,448 bytes, the TLB 28 translates respective bits 31 to 12, bits 31 to 13, and bits 31 to 15 of a LA received from the lines 19, 13. Since the lines 23 transmit 20-bit output signals from the TLB 28 for any page size, some of the 20 bits of address information on the lines 23 do not correspond to the correct PA for some page sizes. The MUX 32 recombines the proper bits from the translated page address from the lines 23 with bits from the portion of the LA on the line 33 to obtain the correct upper 20 bits of the PA for the LA bits (31:12) to line 40. Page size signals operate select inputs of the MUX's 32, 34 to control the selection of bits from the data lines 23 and 33 so that the PA sent to the cache memory 16 is the PA corresponding to the full LA from the logical address generation unit 12 for any page size.

Still referring to FIG. 2, the MUX 32 is in a critical timing pathway for the translator 24. The MUX 32 adds a sequential step of intermediate bit selection after page address translation by the TLB 28. The selection step can slow address translation because of setup times associated with use of the multi-digit MUX 32. The setup time includes, for example, time to generate the page size signal from the TLB 28 and the time to select one of the data inputs of the MUX 32 after receiving the correct page size signal from line 36. For a multiple bit address signals the setup time can be greater than $10^{31\ 9}$ seconds. Since memory accesses involve address translation by the TLB 28, the time for the selecting step may have an impact on the speed of memory accesses. In modem processors operating at high frequencies the added time for multiplexing multiple bit addresses may be significant—a delay of $10^{-9}$ may inconveniently slow memory accesses.

The present invention is directed to overcoming, or at least reducing the effects of, one or more of the problems set forth above.

SUMMARY OF THE INVENTION

In a first aspect, the invention provides for a content addressable memory (CAM). The CAM includes an input port and a plurality of locations to store page addresses for comparing to an address received on the input port. Each location includes a plurality of lower cells and at least one page size mask cell to send signals to an associated one of the lower cells. The associated one of the lower cells produces a match signal in response to either the page size mask cell sending a mask signal or to the portion page address stored therein matching a corresponding portion of the address received from the input port. Each location produces a match signal in response to each cell therein producing a match signal.

A second aspect of the invention provides for a method of translating logical to physical addresses. The method includes comparing a input logical address to a plurality of stored page logical addresses and sending a match signal to a data array in response to a portion of the input logical address matching one of the stored page logical addresses. The stored page logical addresses have a plurality of lengths. The method also includes transmitting a physical address to an output line in response to the data array receiving a match signal for a corresponding page logical address.

BRIEF DESCRIPTION OF THE DRAWINGS

Other objects and advantages of the invention will become apparent upon reading the following detailed description and upon reference to the drawings in which.

Figure 1:
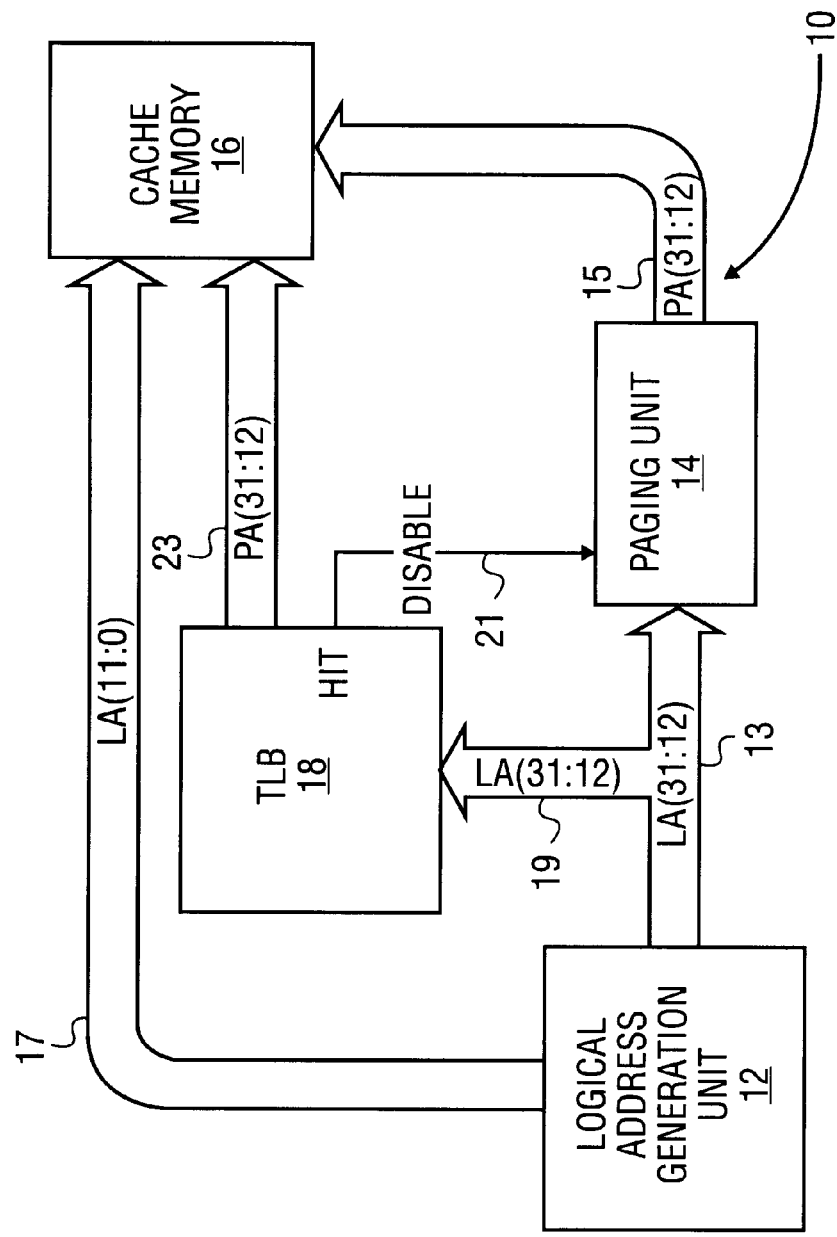
FIG. 1 shows a prior art translator of logical addresses into physical addresses.

While the invention is susceptible to various modifications and alternative forms, specific embodiments thereof have been shown by way of example in the drawings and are herein described in detail. It should be understood, however, that the description of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. In the development of any actual embodiment, numerous implementation-specific decisions must be made to achieve specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 3A:
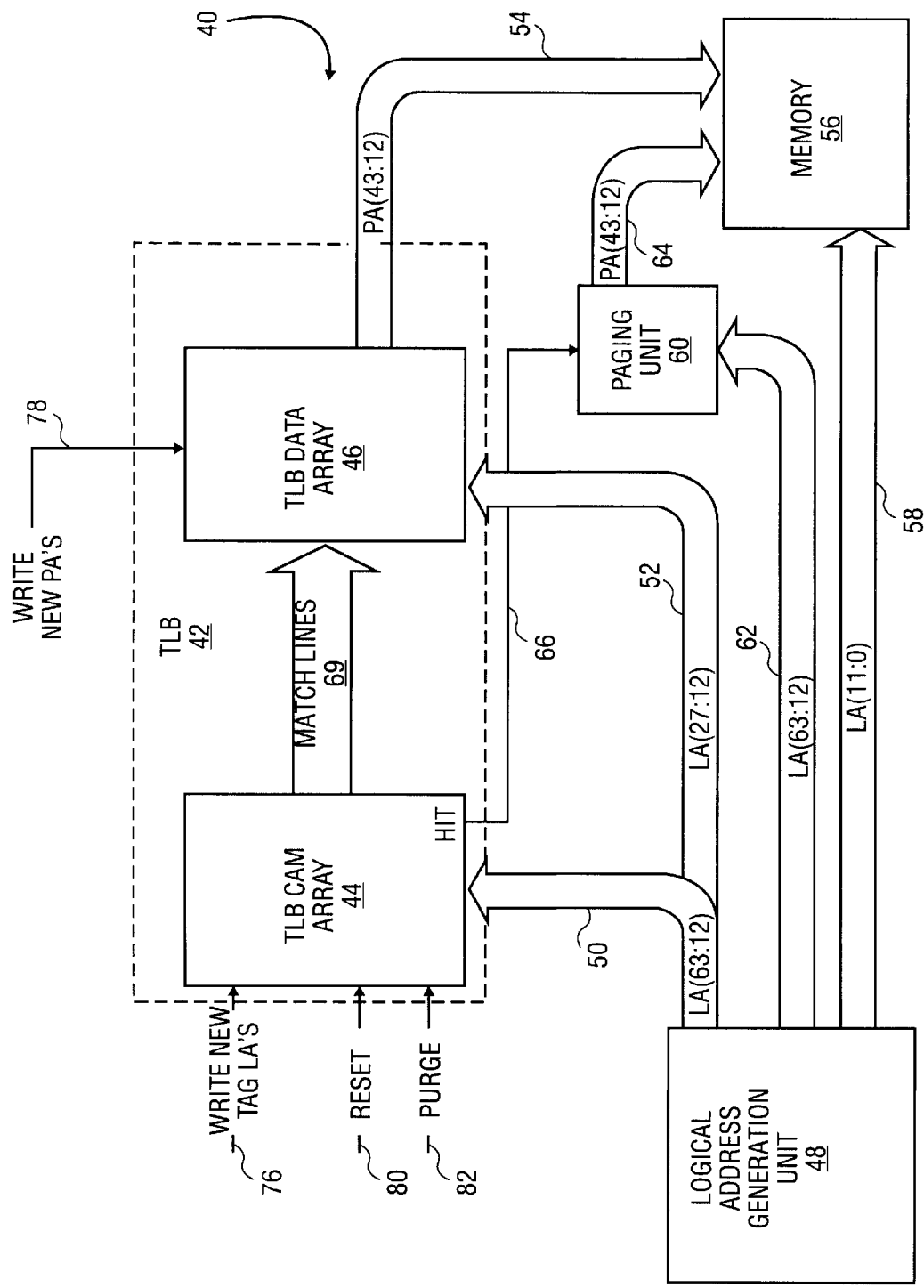
FIG. 3A illustrates an embodiment of a translator of logical addresses into physical addresses for multiple page sizes.

FIG. 3A illustrates an embodiment of an address translator 40 that employs a translation lookaside buffer (TLB) 42. The TLB 42 includes a TLB content-addressable memory (CAM) array 44 and a TLB data array 46. The TLB CAM array 44 stores page LA's for comparison with page LA's received from the line 50. The TLB CAM array 44 transmits a match or "hit" signal to the TLB data array 46 in response to a page LA received from the logical address generation unit 48 matching a LA stored in the TLB CAM array 44. The TLB CAM array 44 is a fully associative CAM, which means that the entire page LA is compared with the entries of the TLB CAM array 44. The TLB data array 46 stores PA's corresponding to the LA's of the TLB CAM array 44. The TLB data array transmits a PA to line 54 coupled to address input terminals of a memory 56 in response to receiving a signal for a match from the TLB CAM array 44. The TLB data array 46 transmits the upper bits of the PA corresponding to the combined LA from the lines 50, 58 to a line 54 coupled to an address input terminal of the memory device 56. The line 58 transmits the lower bits of the LA from the logical address unit 48 to the memory device 56 without any translation.

Still referring to FIG. 3A, the address translator 40 also includes a paging unit 60 for determining the PA of the desired memory location. The paging unit 60 receives the LA of a memory location to be accessed from line 62, and transmits the PA for the location, i.e., page address and relative address on the page, to the memory device 56. If the page LA from the line 50 matches a page LA stored in the TLB CAM array 44, the TLB 42 sends a signal to disable the paging unit 60 to a line 66 coupled to an enable input thereof.

Unlike prior art translators using a different TLB for each page size, the TLB 42 of FIG. 3A is capable of generating PA's for several page sizes. In the embodiment of FIG. 3A, page sizes range from 4,056 bytes to about 256 mega-bytes (MB). As has been explained above, pages of different sizes have LA's with different numbers of the bits. Thus, the TLB 42 translates different segments of the LA received from the line 50 for pages of different sizes. For example, for pages of sizes 256 MB, 64 MB, 8,112, and 4056 KB, the TLB 42 would translate bits 63 to 28, bits 63 to 27, bits 63 to 12, and bits 63 to 11 of the LA received from the line 50. Since different numbers of LA bits are translated for different page sizes, different numbers of LA bits are also transmitted to the memory 56 without translation for pages of different sizes.

Figure 2:
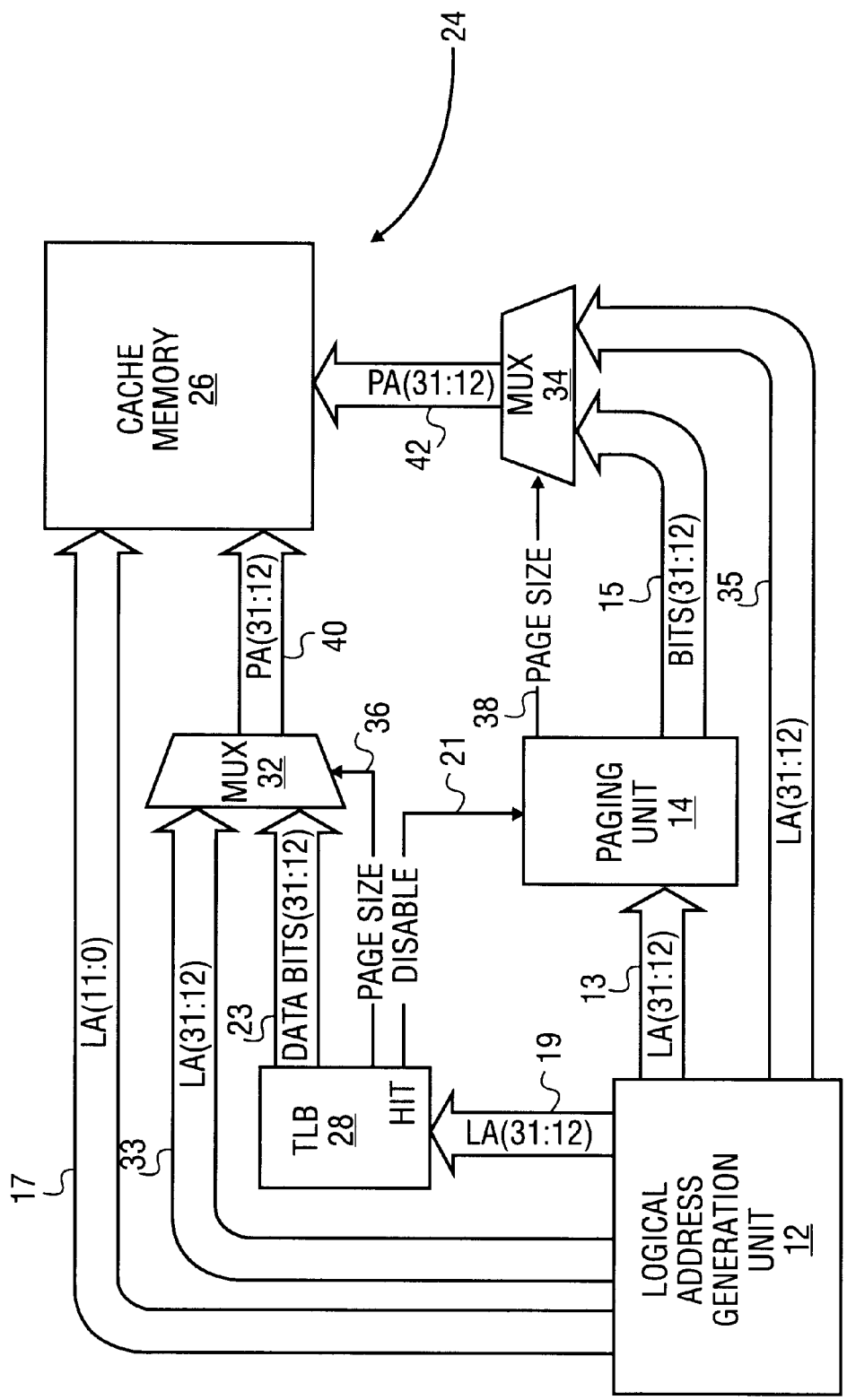
FIG. 2 shows a prior art translator of logical addresses into physical addresses for a memory using multiple page sizes.

Still referring to FIG. 3A, translating an LA to a page PA for different page sizes entails using different members of the intermediate LA bits 27 to 12 to perform the translation. Each intermediate bit of the LA is either used to translate a page LA or is transmitted, without translation, to address input terminals of the memory 56. Special hardware (not shown) of the TLB data array 46 selects either intermediate bits of the LA from the line 52 or corresponding bits of a PA stored in the TLB data array 46 for transmission to the memory 56. Unlike the prior art translator 24 of FIG. 2, the TLB data array 46 performs the selecting step in parallel with the translation of the page LA. The parallel performance of selecting and translating may decrease the time needed to translate a LA of a memory location to below the time needed to serially translate and then multiplex as was done in the prior art translator 24 of FIG. 2.

Figure 3B:
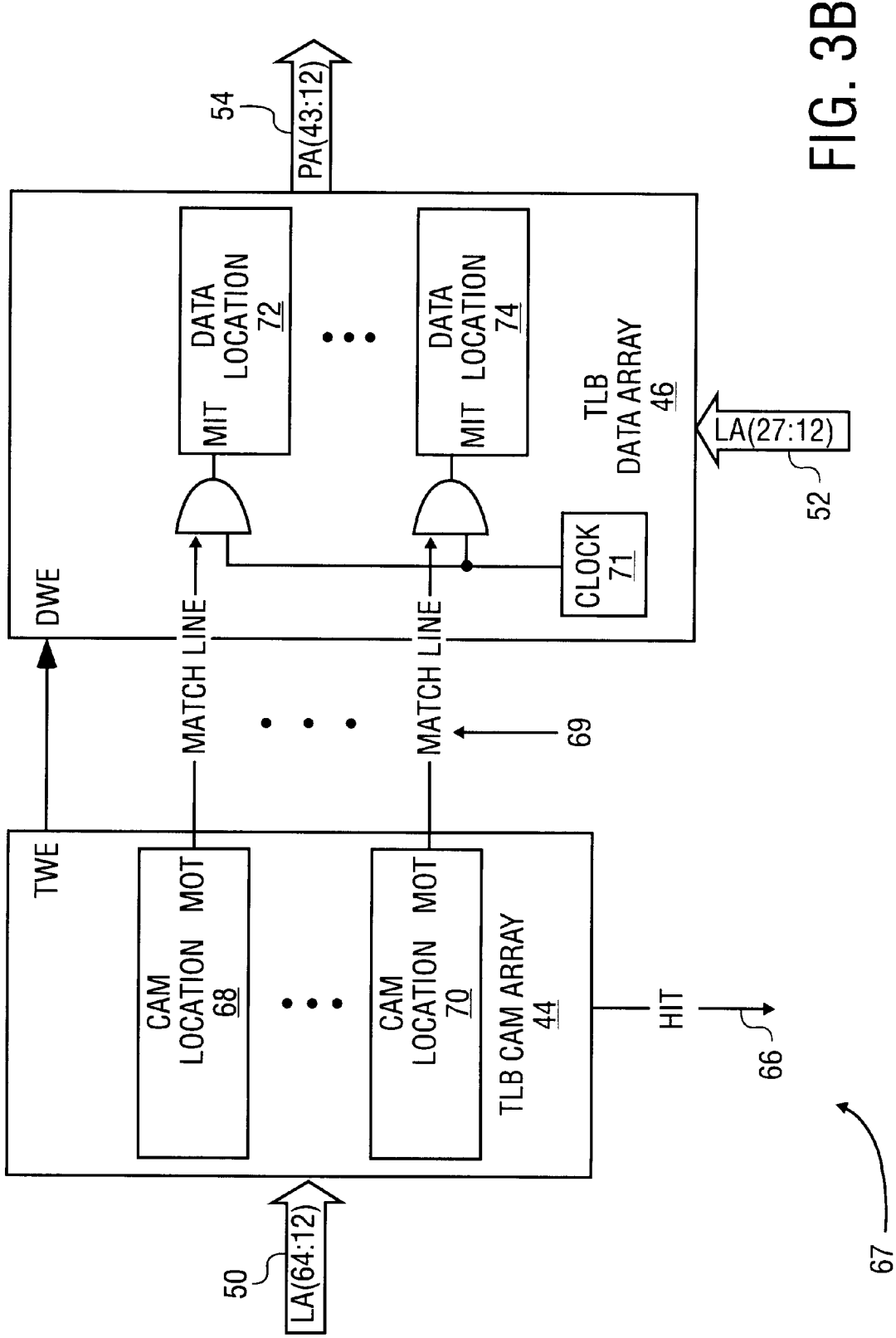
FIG. 3B illustrates one embodiment of the translation lookaside buffer of FIG. 3A.

FIG. 3B illustrates an embodiment 67 of the TLB 42 of FIG. 3A. The TLB CAM array 44 has a plurality of CAM locations 68, 70, i.e., tag locations, for storing page LA's for comparison with LA's received from the line 50. The TLB data array 46 has a plurality of data locations 72, 74 to store PA's. The TLB data array 46 transmits a stored PA to the output line 54 of FIG. 3A in response to a match between a LA stored in the corresponding CAM location 68, 70 and the incoming page LA from the line 50. The CAM locations 68, 70 transmit signals for matches between the stored and received LA's on match lines 69. The match lines 69 couple match output terminals MOT of the CAM locations 68, 70 to match input terminals MIT of the corresponding data locations 72, 74. A clock 71 synchronizes the receipt of match signals by the data locations 72, 74. The TLB CAM array 44 also transmits a signal to the line 66 to disable the paging unit 60 of FIG. 3A in response to a match between a LA stored in the CAM array 44 and the page LA from the line 50.

Referring again to FIG. 3A, the TLB 42 also has an input port 76 for writing/storing new LA's to the CAM locations 68, 70 and a port 78 for writing new PA's to the data locations 72, 74. Some embodiments of the TLB 42 also include ports 80, 82 for receiving reset and purge signals, which will be described below.

Figure 3C:
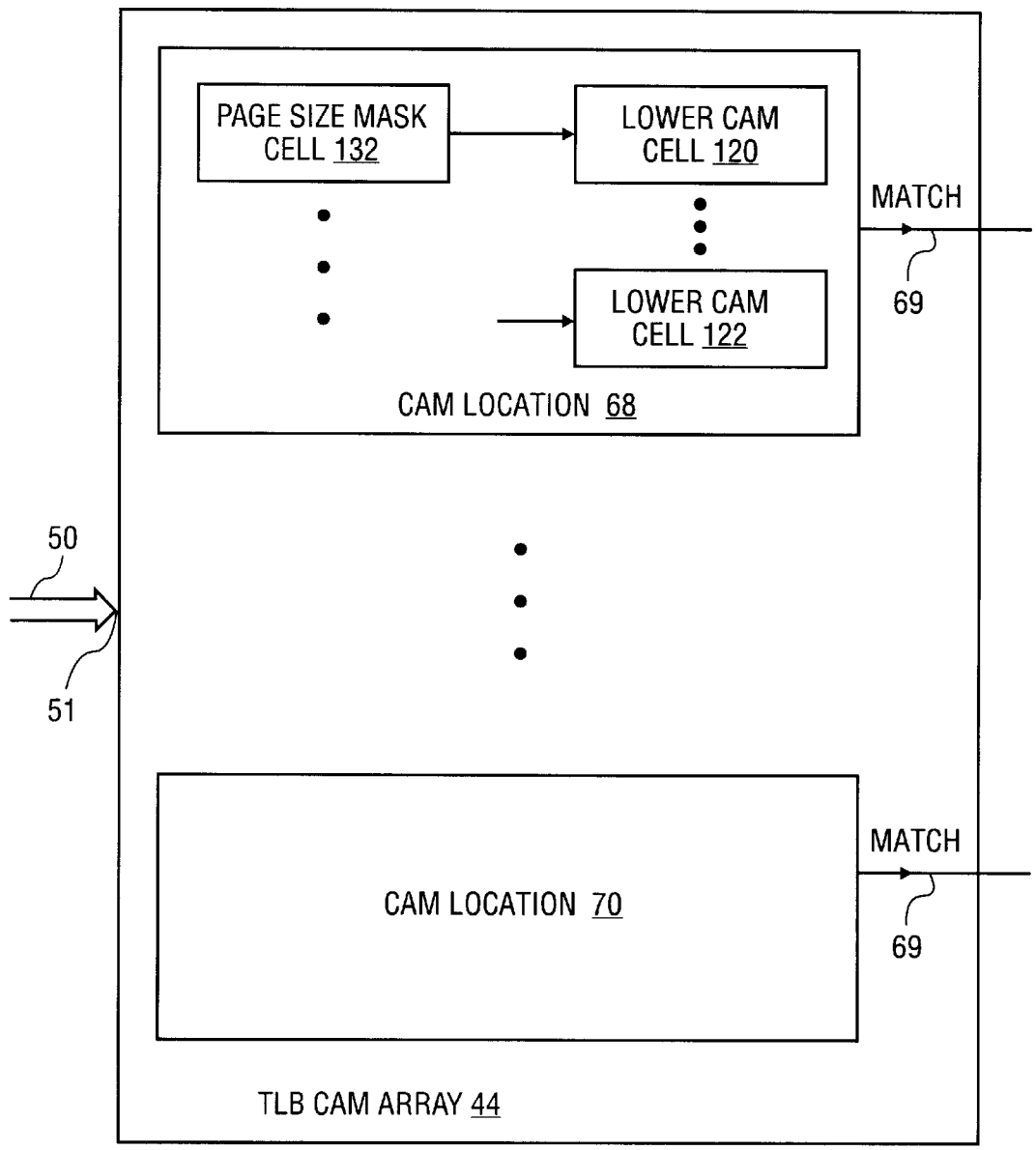
FIG. 3C illustrates the operation of the TLB CAM array of FIGS. 3A and 3B.

FIG. 3C illustrates the construction of the TLB CAM array 44 of FIGS. 3A and 3B. The TLB CAM array 44 has an input port 51 to receive a LA from the line 50. Each of the plurality of CAM locations 68, 70 can store one page LA. By using known constructions, the TLB CAM array 44 is a fully associative so that the LA from the input port 51 is compared to the page LA of each of the CAM locations 68, 70. Each TLB CAM location 68, 70 comprises a plurality of lower cells 120, 122 and at least one page size mask cell 132. The page size mask cell 132 is connected to an associated lower cell 120. In some embodiments, the TLB CAM cells 68, 70 also include upper cells (not shown). The upper and lower cells store the ordered bits of a page LA. Each page size mask cell 132 can disable the associated lower cells 120 so that the CAM location 68 can store page LA's of different sizes. The associated lower cells 120 produce match signals in response to either the page size cell 132 being in a first state or to the portion of the page LA stored therein matching the corresponding portion of the LA received from the input port 51. Each TLB CAM location 68, 70 produces a match signal in response to each cell therein producing a match signal.

Figure 3D:
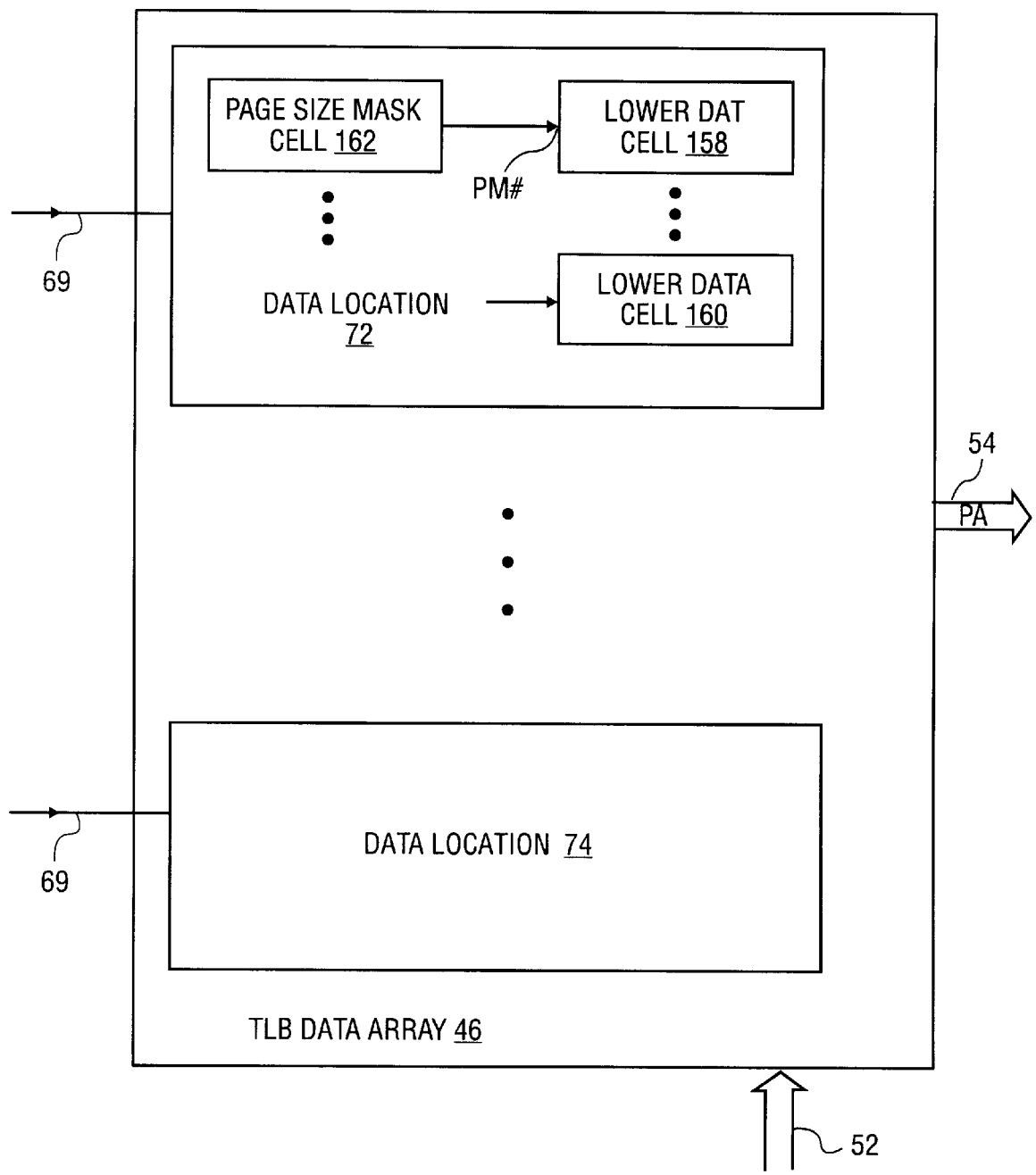
FIG. 3D illustrates the operation of the TLB data array of FIGS. 3A and 3B.

FIG. 3D illustrates the construction of data locations 72, 74 of the TLB data array 46 of FIGS. 3A and 3B. Each data location 72, 74 transmits a PA to the output line 54 in response to receiving a match signal from a corresponding one of the lines 69. Each data location 72 includes at least one page size mask cell 162 and a plurality of lower data cells 158, 160. Each lower data cell 158, 160 stores a digit of a PA and receives a corresponding digit of a LA from the line 52 of FIGS. 3A and 3B. The page size mask cell 162 transmits one of two preselected signals to the associated lower data cells 158. The first signal activates an associated data cell 158, and the second signal masks the associated data cell 158. The data cell 158 transmits the digit of the PA stored therein in response to receiving the first signal from the associated mask cell 162 and transmits the corresponding digit of the intermediate LA received from the line 52 in response to receiving the second signal from the associated page size mask cell 162.

Figure 4A:
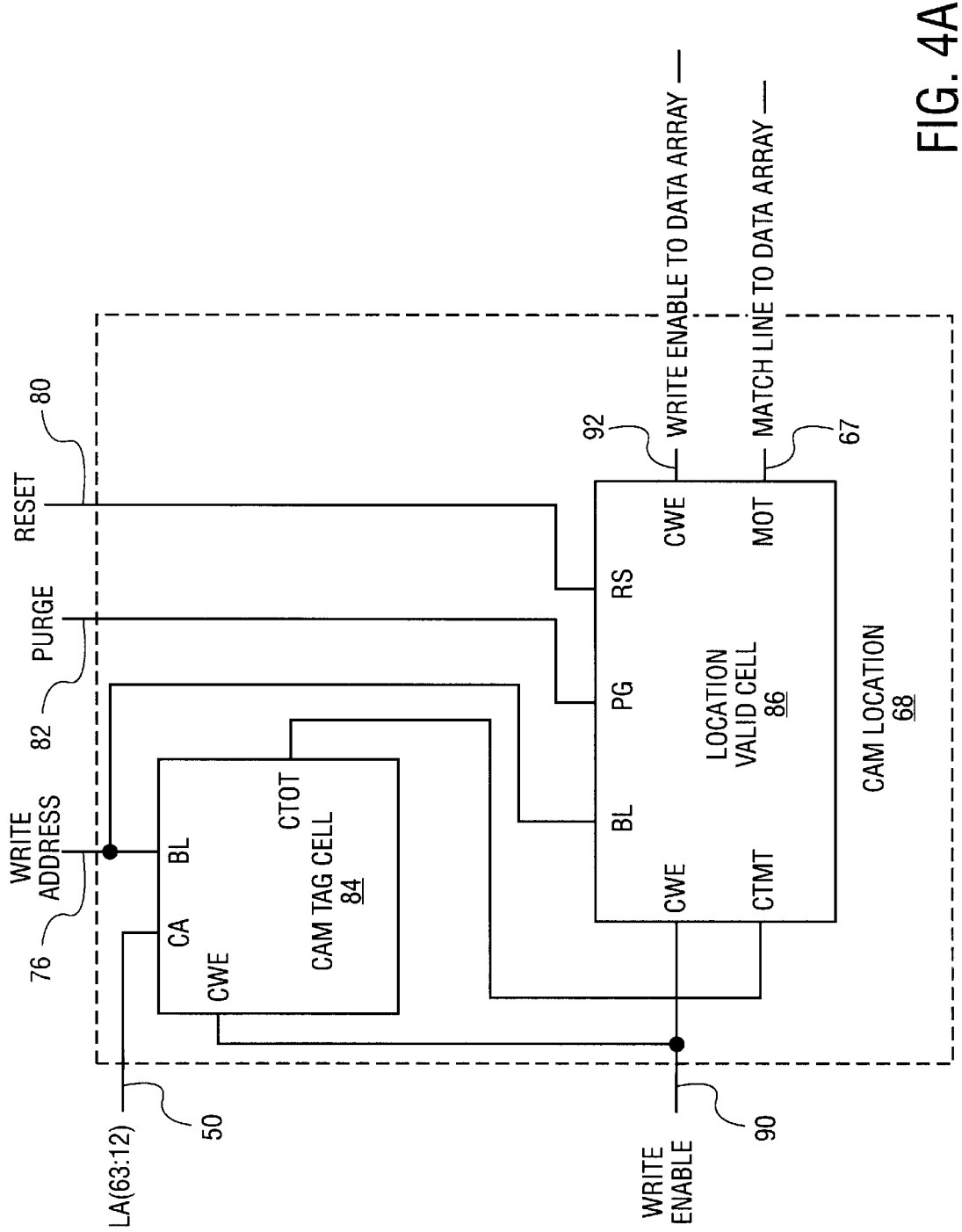
FIG. 4A is a high-level block diagram of one specific embodiment of the CAM location in the TLB of FIG. 3B.

FIG. 4A is a high-level block diagram of the CAM location 68 in FIG. 3B. The CAM location 68 comprises a CAM tag cell 84 and a location valid cell 86. The CAM tag cell 84 stores a single LA to be compared with a page LA received from the line 50. The CAM tag cell 84 includes one or more input terminals CA for receiving LA's from the line 50. The CAM tag cell 84 generates a match signal on the output terminal CTOT in response to the LA stored therein matching the page LA received from the line 50. The CAM tag cell 84 stores size data for the page corresponding to the LA stored therein. The location valid cell 86 receives match signals from the associated CAM tag cell 84 on an input terminal CTMT. The location valid cell 86 sends a match signal to an output terminal MOT in response to a bit stored therein being in a "valid" state. The output terminal MOT couples to the match lines 68 of FIGS. 3A, 3B. Thus, the CAM tag cell 84 generates a match signal in response to a match with the page LA from the line 50, and the location valid cell 86 transmits the match signal to the TLB data array 46 in response to the CAM location 68 being set to a "validate state."

Still referring to FIG. 4A, the CAM location 68 also has a port 76 for writing new LA's and page sizes to the CAM tag cell 84 and for changing the valid/invalid status of the location valid cell 86. A terminal 90 enables/disables writes to the CAM tag and to the location valid cell 84, 86. The location valid cell 86 transmits the write enable signal from the line 90 to the TLB data array 46 via the line 92. Thus, writes simultaneously change a LA and page size stored in one of the CAM locations 68, 70 and the PA and page size stored in the corresponding data location 72, 74 so that CAM matches produce updated PA's.

Figure 4B:
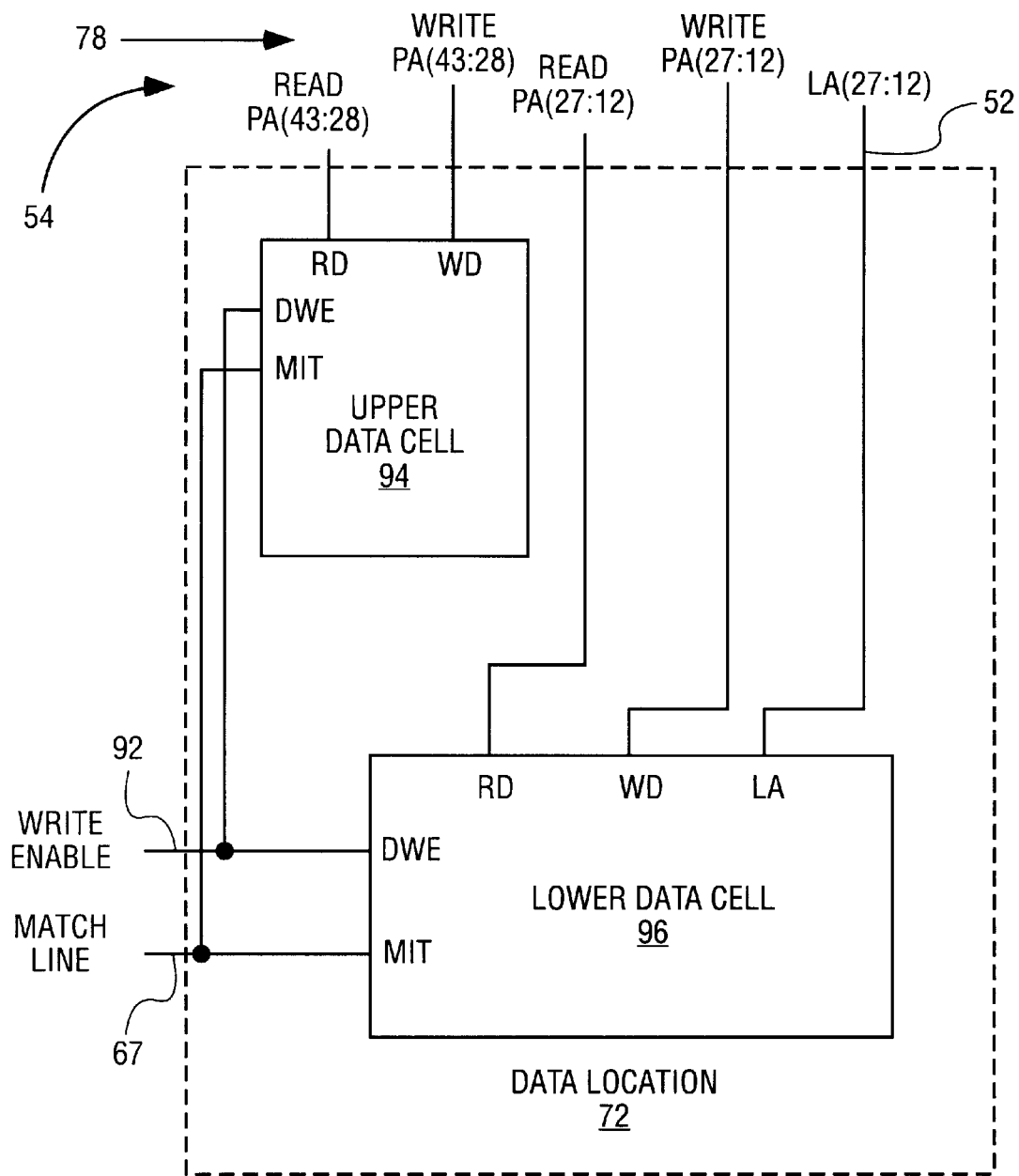
FIG. 4B is a high-level block diagram of one specific embodiment of the data location in the TLB of FIG. 3B.

FIG. 4B is a high level block diagram of the data location 72 of FIG. 3B. The data location 72 has both upper and lower data cells 94, 96. The upper data cell 94 generates a fixed number of upper bits i.e., bits 43 to 28, of a page PA at an output terminal RD of the upper data cell 94 in response to receiving a match signal from the corresponding CAM location 68 on an input terminal MIT. The lower data cell 96 generates intermediate bits of a PA, i.e., bits 27 to 12 on the line 54, in response to either receiving a match signal from the corresponding CAM location 68 on the input terminal MIT or to receiving corresponding bits of the LA from the line 52 of FIG. 3A. The upper and lower data cells 94, 96 also have input terminals DWE for writing a new PA therein in response to a write enable signal on the data write enable input terminals DWE.

Figure 5A:
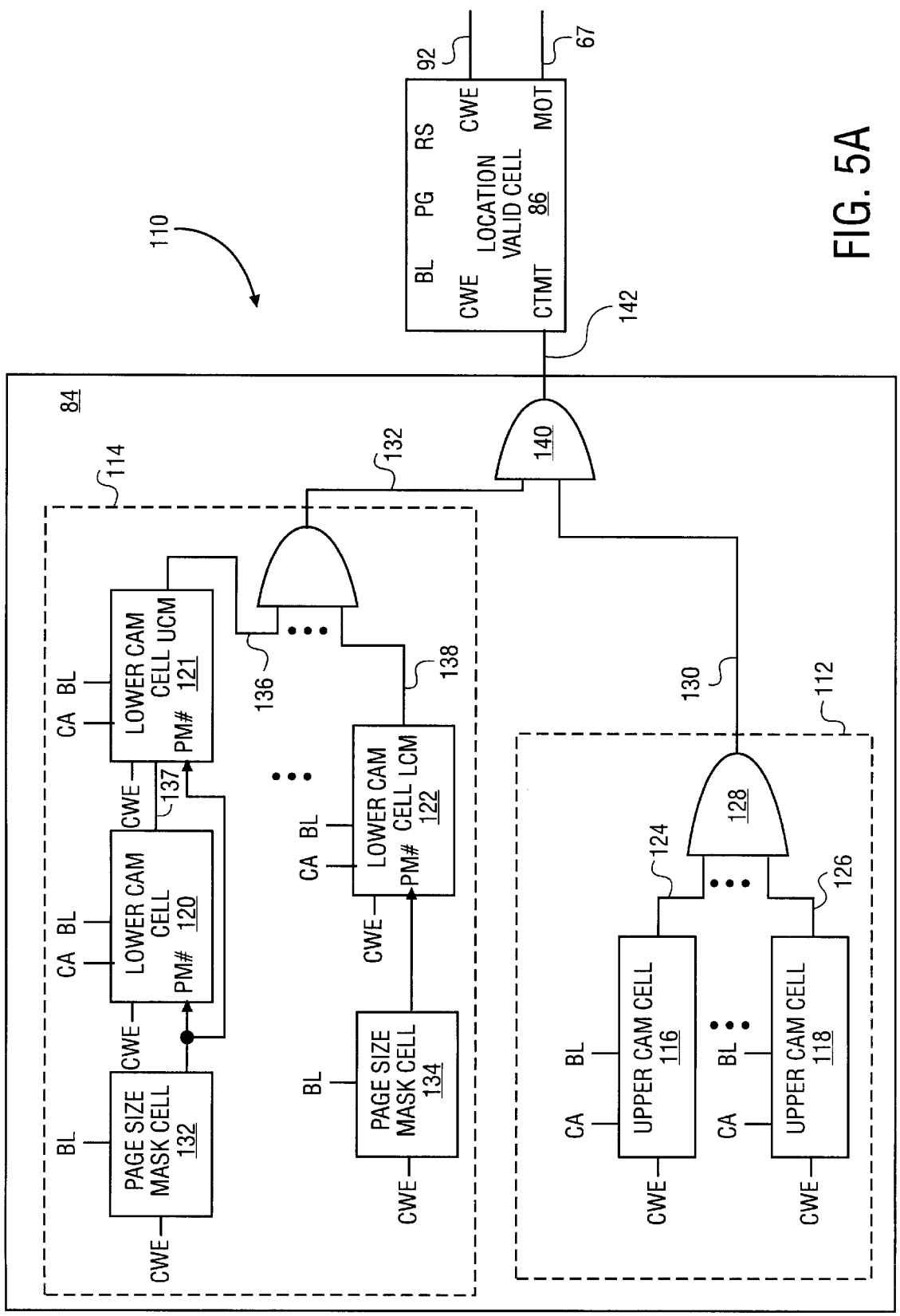
FIG. 5A is a circuit diagram of one embodiment of the CAM location of FIG. 4A.

FIG. 5A is a circuit diagram for an embodiment 110 of the CAM location cell 68 of FIG. 4A. The CAM tag cell 84 includes upper and lower storage cells 112, 114 for storing respective upper and lower bits of a page LA. For the embodiments of FIGS. 3A to 4B, the upper bits correspond to bits 63 to 28 of LA's received from the line 50 and the lower bits of a page LA correspond to intermediate bits 27 to 12 of LA's received from the line 50 though the scope of the invention is not limited to this choice. The CAM tag cell 84 performs comparisons of bits of the page LA stored therein to corresponding bits of the LA received from the line 50.

Still referring to FIG. 5A, the upper storage cell 112 comprises a separate upper CAM cell 116, 118 for storing each upper bit of a page LA. Each upper CAM cell 116, 118 generates a match signal on an associated output line 124, 126 in response to the upper bit of a LA on the input terminal CA matching the bit of the page LA stored in the respective upper CAM cell 116, 118. The match lines 124, 126 from all of the upper CAM cells 116, 118 couple to input terminals of an AND-gate 128. The AND-gate 128 generates a match signal on line 130 in response to each of the upper bits of the page LA stored in the upper CAM cells 116, 118 matching the corresponding bits of the LA received on the input terminals CA, i.e., from the line 50.

Still referring to FIG. 5A, the lower storage cell 114 comprises a separate lower CAM cell 120, 121, 122 for storing each lower bit of a page LA. The intermediate bits of the LA from lines 50 are received on input terminals CA of the corresponding lower CAM cells 120, 121, 122. The lower storage location 114 also has page size mask cells 132, 134 to store page size information for the page LA stored in the CAM tag cell 84. The lower CAM cells 120, 121, 122 generates match signals on the output lines 136, 137, 138 thereof in response to bit of the LA received on the input terminals CA matching the bits of the page LA stored therein. If one of the page size mask cells 132, 134 transmits a logic 0 signal at the PM# input terminals of the associated lower CAM cells 120, 121, 122, the bits stored in the associated lower cells 120, 121, 122 are masked from being part of the LA of the "page" for which the CAM tag cell 84 stores the LA address.

Still referring to FIG. 5A, each page size cell 132, 134 is associated with one or more lower CAM cells 120, 121, 122 and enables implementing different page sizes in the TLB CAM array 44. For example, the page size cell 132 is associated with the two lower CAM cells 120, 121, and the page size mask cell 134 is associated with the one lower CAM cell 122. A page size mask cell masks lower CAM cells associated therewith from being used in address matching with LA's from the line 50 by transmitting a signal of logic 0 to the associated PM# input terminals. Lower CAM cells receiving a logic 0 signal on the PM# input terminal thereof are referred to as "don't care CAM cells." Don't care CAM cells store bits, which are not compared to a LA from the line 50. Removing a bit from match comparisons increases the size of associated page by a factor of two. For example, a page for which the page size mask cell 132 generates logic 1 would have one fourth the size of a page for which the page size mask cell 132 generates logic 0. Similarly, configuring the page size cell 132 to generate logic 0 would decrease the page size by a factor of 2. The associations between page size mask cells and lower CAM cells determine the different page sizes that the TLB 42 can support.

Still referring to FIG. 5A, the upper and lower storage locations 112, 114 transmit match signals to an AND-gate 140. The AND-gate 140 transmits a match signal to the input terminal CTMT of the associated location valid cell 86 if all of the CAM cells 116, 118, 120, 121, 122 either match the corresponding LA bits received from the lines 50 or are don't-care cells. Thus, a match signal is generated on line 142 in response to the bits of the LA matching the bits of the LA stored in the TLB CAM array 44, which are LA bits of a "page."

Figure 5B:
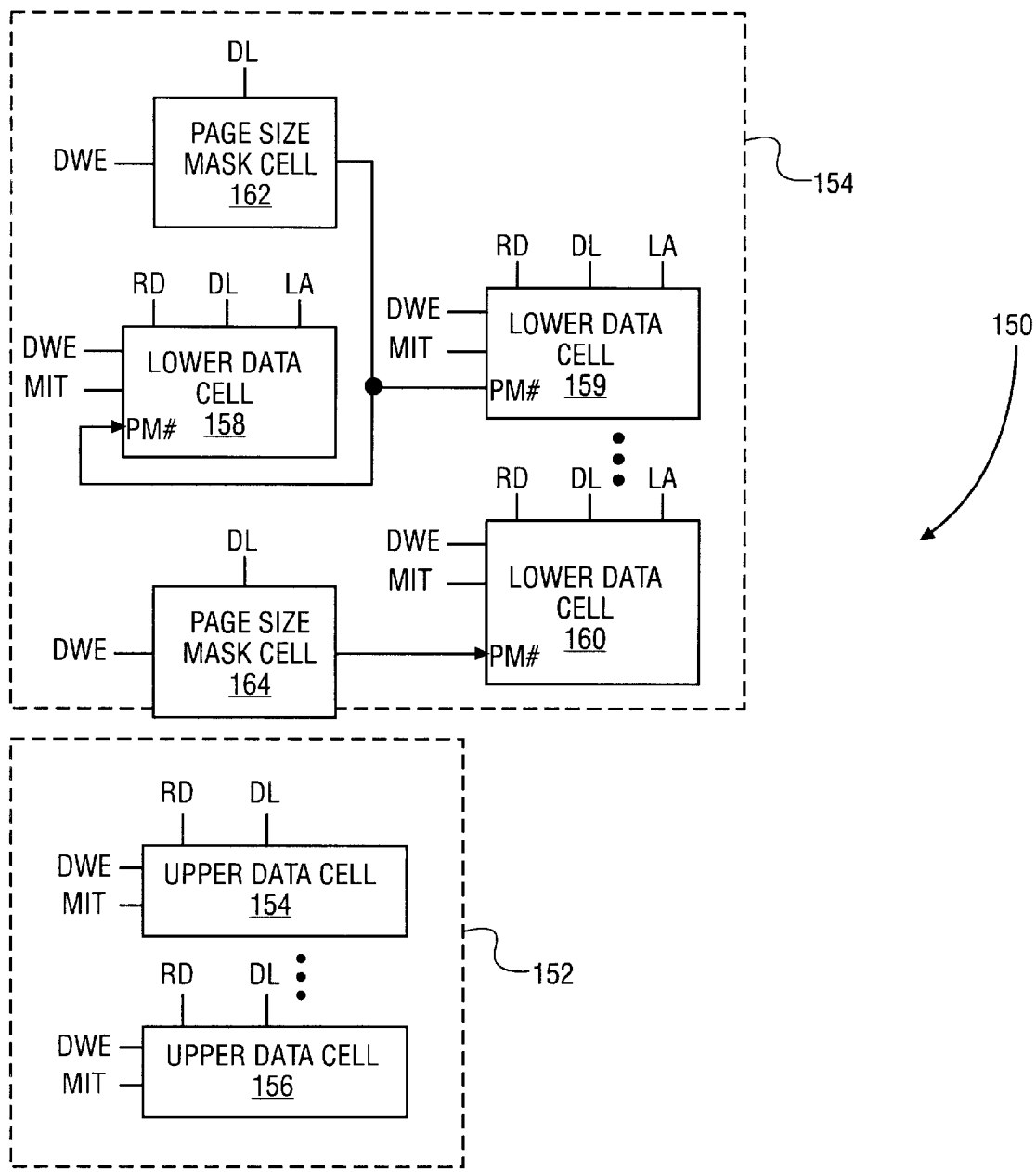
FIG. 5B is a circuit diagram of one embodiment of the data location of FIG. 4B.

FIG. 5B is a circuit diagram for an embodiment 150 of the data location 72 of FIG. 4B. The data location 72 comprises upper and lower storage cells 152, 154 for storing respective upper and intermediate bits of the PA corresponding to a LA stored in the associated CAM location 68 of the TLB CAM array 44 of FIG. 3B. The upper storage location 154 has a separate data cell 154, 156 for each upper bit of the PA stored therein. The lower storage cell 154 has a separate lower data cell 158, 160 for each bit of the PA stored therein. Each data cell 154, 156, 158, 159, 160 has an output terminal RD for reading the bit of the PA stored therein. The output terminals RD connect to the output line 54 of FIGS. 3A and 3B.

Still referring to FIG. 5B, the page size mask cells 162, 164 enable selecting between transmitting bits of PA's stored in the TLB data array 46 and corresponding intermediate bits of LA's received on the line 52 as a function of page size. Each page size mask cell 162, 164 determines whether or not the PA bits of the associated lower data cells 158, 159, 160 will be transmitted to the read terminals RD in response to a match signal from the corresponding CAM location 68. If a PA bit is not to be transmitted, the corresponding lower data cell 158, 159, 160 transmits an intermediate bit received at a LA input terminal to the output terminal RD. The input terminals LA couple to the line 52 of FIGS. 3A and 3B. A lower data cell 158, 159, 160 transmits the bit of the LA from the LA input terminal in response to receiving a signal having the value logic 0 on the PM# input terminal from the page size mask cell 162, 164 coupled thereto. The associations between page size mask cells and lower data cells in the TLB data array 46 mirror the associations between page size mask cells and lower CAM cells in the TLB CAM array 40. The configuration of the page size mask cells 162, 164 program the lower data storage locations 154 to select between transmitting bits of PA's stored therein and intermediate bits of LA's.

Still referring to FIG. 5B, the upper and lower storage locations 152, 154 also have input terminals DL for writing new PA's to the data cells 154, 156, 158, 159, 160 and new page sizes to the page size mask cells 162, 164. To perform a write to the upper and lower data storage locations 152, 154 an enable signal is transmitted to input terminals DWE.

FIGS. 6A–6C and 7A–7C are circuit diagrams of double-ported embodiments 170–175 of the cells 116, 120, 132, 86, 154, 158, 162 of FIGS. 5A and 5B. The double-porting enables two LA address translations to be performed simultaneously. In the upper and lower CAM cells 170, 171, the input terminal CA for receiving LA's for compare to addresses stored therein has two independent ports CA0, CA1. The upper and lower CAM cells 171, 172 also have two independent upper lines UML0, UML1 and lower lines LML0, LML1 corresponding to the independent input ports CA0, CA1. Similarly, the location valid cell 176 of FIG. 6D has two match ports MOT0, MOT1 for transmitting match signals for LA's received on the terminal CA0 and the terminal CA1, respectively. The match lines 69 couple the output ports MOT0 and MOT1 to respective MIT0 and MIT1 match input ports of the upper and lower data cells 173, 174. Finally, matches for LA's received on the CA0 and the CA1 ports of the CAM cells 171, 172 generate PA signals on respective RD0 and RD1 output lines of the upper and lower data cells 173, 174. The present invention is intended to cover both single and multiple ported embodiments of the cells 116, 120, 132, 86, 154, 162 of FIGS. 5A and 5B.

Figure 6A:
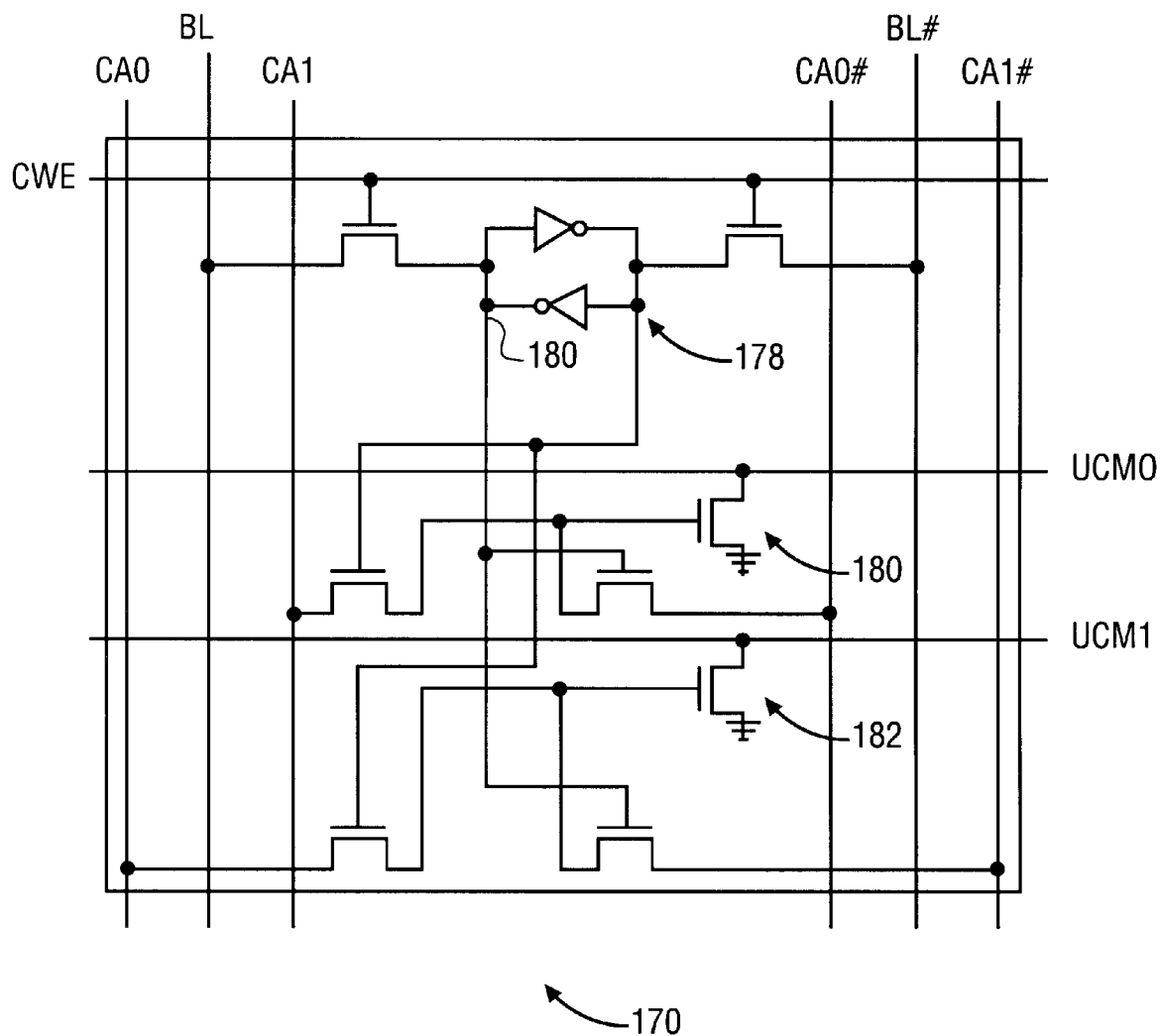
FIG. 6A is a circuit diagram of a double-ported embodiment of the upper CAM cell of FIG. 5A.

FIG. 6A illustrates a double-ported embodiment 170 of the upper CAM cell 116 of FIG. 5A. The upper CAM cell 170 has a single cell 178 for storing one bit of a LA. The lines BL and BL# can write new data to the cell 172 if a CAM write enabling signal having the value of logic 1 is applied to the input terminal DWE. To compare a bit of a LA received on either port CA0 or port CA1 with the bit stored in the cell 178, the corresponding upper CAM match port UCM0 or UCM1 is first precharged to a positive voltage corresponding to a logical 1 state. If the LA bit from the port CA0 or the port CA1 matches the logic value of the stored bit at the point 180 of the cell 178, the signal on the corresponding upper CAM match port UCM0 or UCM1 remains at the positive voltage or value logic 1. If the LA bit on the port CA0 or the port CA1 does not match the logic value at the point 180, a transistor 182, 184 pulls the corresponding upper CAM match port UCM0 or UCM1 to ground or a value of logic 0. Thus, the upper CAM cell 170 generates signals having the values of logic 1 and logic 0 at the ports UCM0, UCM1 in response to respective matches and non-matches the between signals at the ports CA0 and CA1 and the bit stored at the point 180.

Figure 6B:
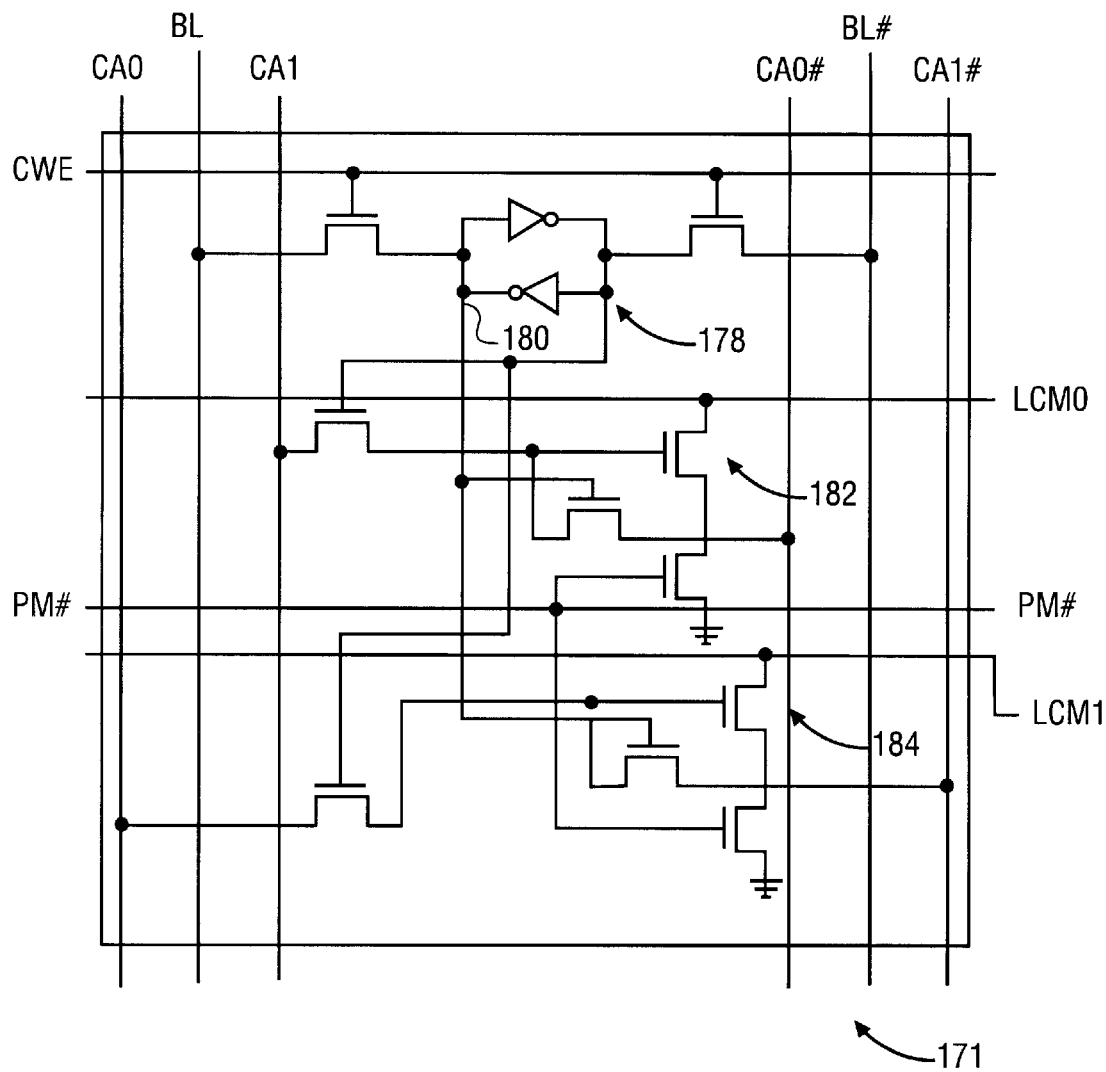
FIG. 6B is a circuit diagram of a double-ported embodiment of the lower CAM cell of FIG. 5A.

FIG. 6B is a circuit diagram of a double-ported embodiment 171 of the lower CAM cell 120 of FIG. 5A. Similarly to the upper CAM cell 170 of FIG. 6A, the lower CAM cell 171 compares of logic bits received on the input ports CA0, CA1 to a logic value stored in a cell 180. In the lower CAM cell 120, the matching operation may be masked by applying a signal of logic 0 to the pages size mask port PM#. When the signal on the line PM# takes the value logic 0 any input logic address on the line CA0 or the line CA1 produces a match signal having the value logic 1 on the corresponding lower CAM match port LCMO or LCM1. The page size mask port PM# enables lower CAM cells to be masked from comparisons to page LA's from the line 50 in FIGS. 3A and 3B so that the TLB 42 supports multiple page sizes.

Figure 6C:
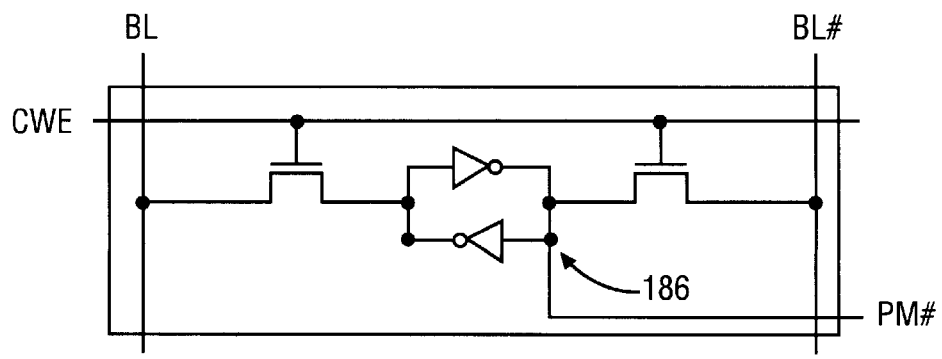
FIG. 6C is a circuit diagram of an embodiment of the page size mask cell of FIG. 5A.

Referring to FIGS. 3A, 3B, and 6C, the "page" portion of an LA from the logic address generation unit 48 has a different length for pages of different sizes. The TLB CAM array 44 only compares the bits of a LA from line 50 that correspond to a "page" address to entries stored in the CAM locations 68, 70. Since LA's received from line 50 have the same number of bits even though pages LA's have differing numbers of bits, the CAM locations 68, 70 need to ignore the portion of the bits of the incoming LA not corresponding to the LA of a "page" when checking for matches. When a LA is stored in the CAM cells 68, 70 data on the size of the page associated with the LA is also stored in the pages size mask cells 132, 134 of FIG. 5A. The page size data operates to mask comparisons with bits of the CAM cells 68, 70 that do not correspond to bits of a "page" LA stored therein.

FIG. 6C illustrates an embodiment 180 for the page size mask cell 132 of FIG. 5A. The page size mask cell 180 has a storage element 190 for storing a single mask bit. If the mask bit variable has the value logic 1 at the point 192, the page size mask cell 180 will mask LA bits of associated lower CAM cells 120, 121 of FIG. 5A. The PM# input terminal of the page size mask cell 180 couples to the PM# input terminals of the lower CAM cells 120, 121 of FIG. 5A. LA bits in the lower CAM cells 120, 121 are masked by storing a value of logic 1 or a positive voltage to the BL write terminal of the page size mask cell 132.

Figure 6D:
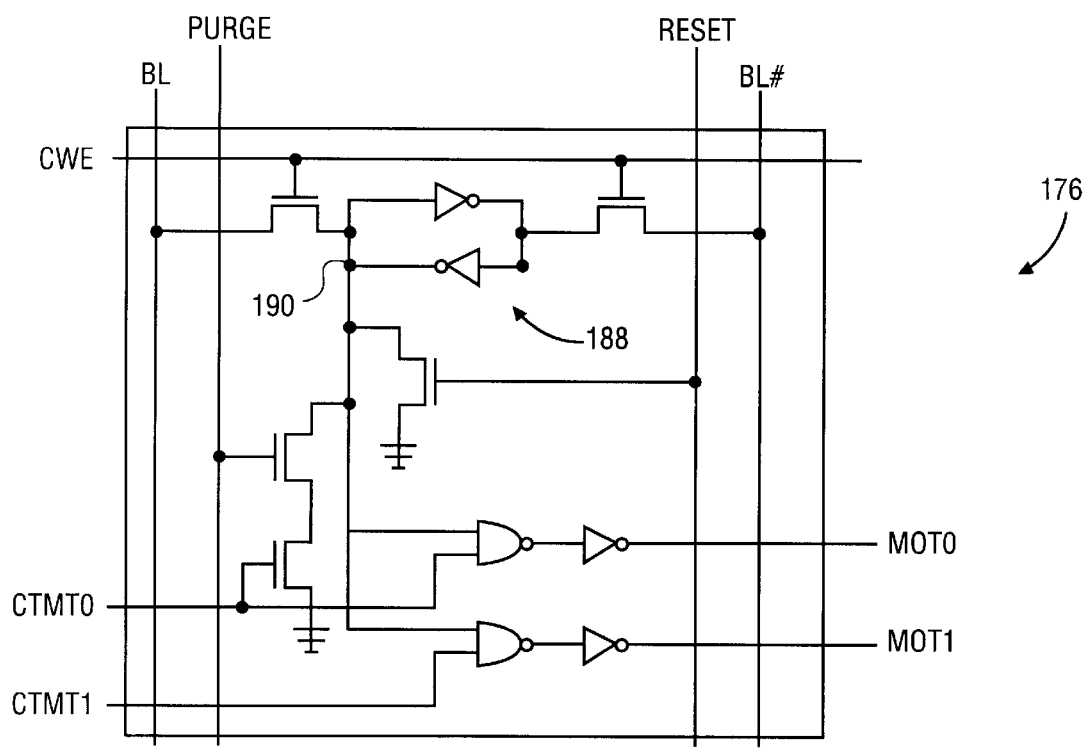
FIG. 6D is a circuit diagram of a double-ported embodiment of the valid bit cell of FIG. 5A.

FIG. 6D is a double-ported embodiment 176 of the location valid cell 86 of FIGS. 4A and 5A. The location valid bit 86 transmits input match signals on terminals CTMT0 and CTMT1 to corresponding output terminals MOT0 and MOT1 in response to a valid bit stored in the binary storage cell 188 having the value logic 1, i.e., the voltage at the point 190 being logic 1. If the valid bit has the value logic 0, matches detected by the corresponding CAM tag cell 84 of Figure A are not transmitted to the corresponding TLB data location 72. New values can be written to the valid bit through the input terminal BL if the CWE is enabled by a signal having the value logic 1.

Still referring to FIG. 6D, the location valid cell 176 also has reset and purge input terminals RS, PG for resetting the value of the valid bit. By applying a signal of logic 1 to the RS input terminal, the binary value at the point 190 is reset to logic 0. Thus, the RS terminal can be used to mask entire LA's stored in the CAM locations 68, 70 from being compared to LA's from the line 50. By applying a signal of logic 1 to the PS input terminal, the valid bit is reset in response to a match signal with respect to the port CA0.

Figure 7A:
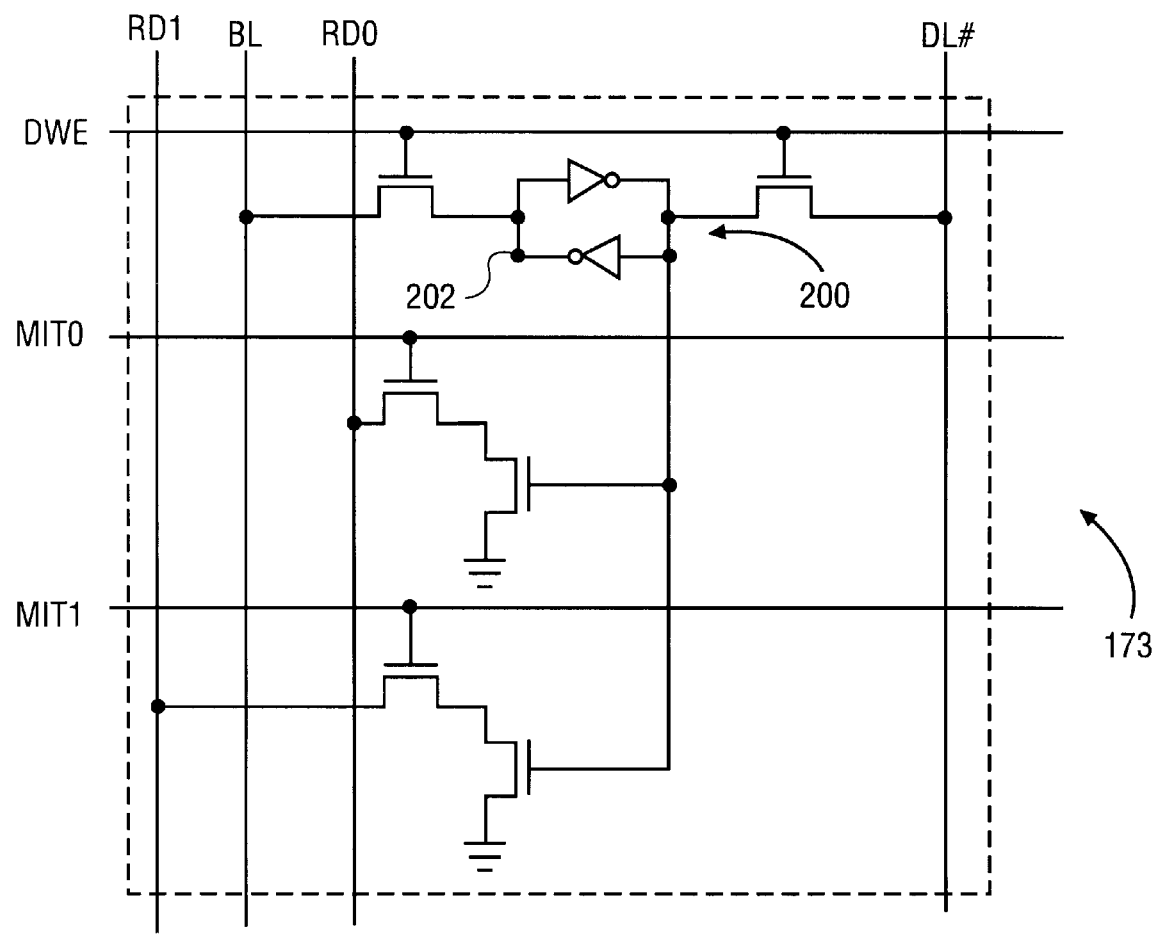
FIG. 7A is a circuit diagram of a double-ported embodiment of the upper data cell of FIG. 5B.

FIG. 7A is a circuit diagram of a double-ported embodiment 173 of the upper data cell 154 of FIG. 5B. The upper data cell 173 includes a storage cell 200 for a binary digit of a PA. A new value for the PA bit may be written to the storage cell 200 through the input terminals DL and DL#. A signal of logic 1 on the DWE line enables writes to the terminal DL and DL#. The upper data cell 173 also has input ports MIT0 and MIT1 for receiving match signals from a corresponding CAM location 68. To perform a read, the output lines RD0, RD1 are precharged to a positive voltage, i.e., logic 1. If one of the match input ports MIT0, MIT1 receives a signal of value logic 1, a corresponding output port RD0, RD1 reads the logic value of the PA bit at point 202 of the storage cell 200. If one of the match inputs MIT0, MIT1 receives a signal of logic 0, the corresponding read output RD0, RD1 remains at the precharge value of logic 1.

Figure 7B:
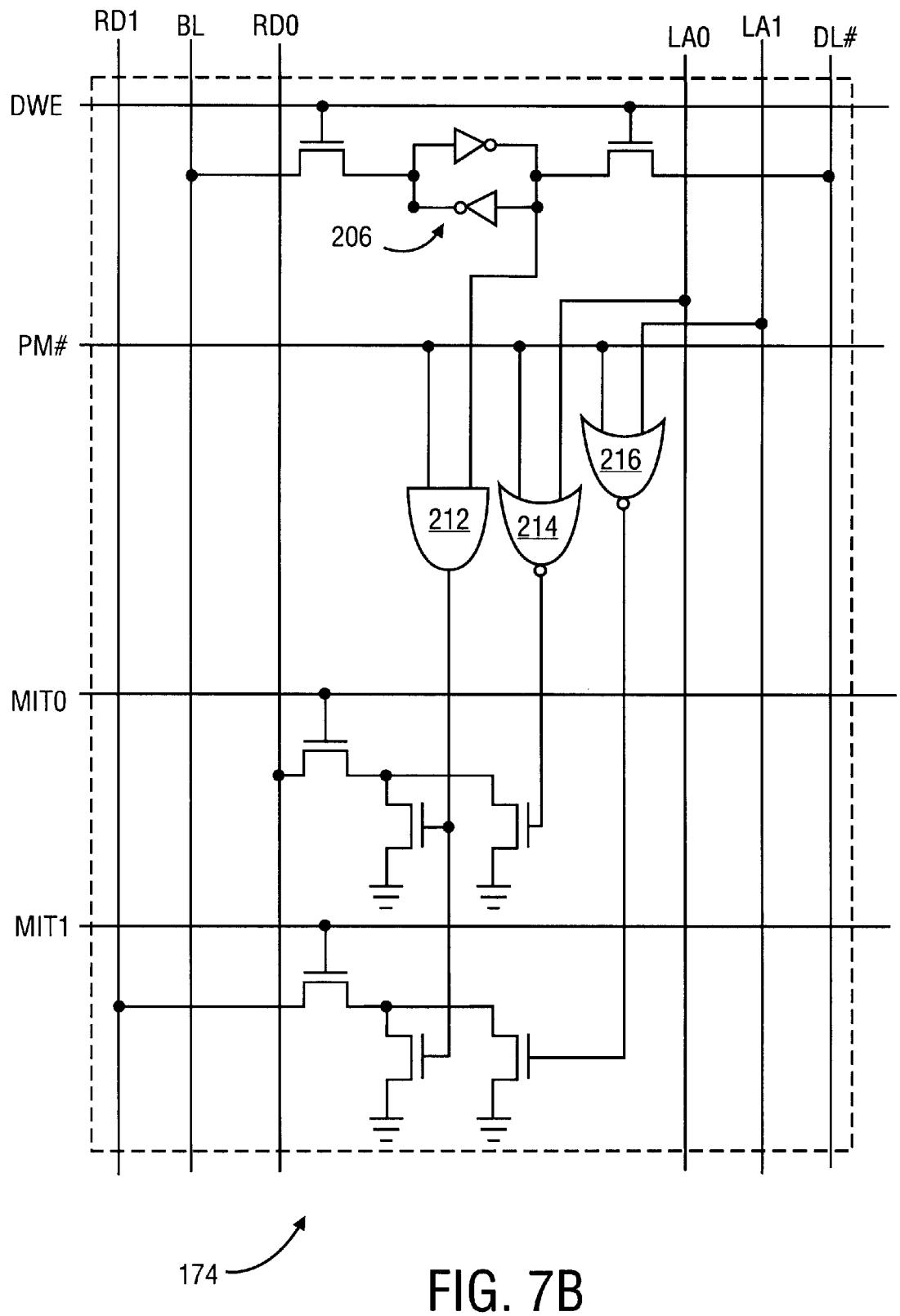
FIG. 7B is a circuit diagram of a double-ported embodiment of the lower data cell of FIG. 5B.

FIG. 7B is a circuit diagram for a double-ported embodiment 174 of the lower data cell 158 of FIG. 5B. The lower data cell 174 has two match input ports MIT0, MIT1 for receiving match signals from the corresponding CAM cell 68. The lower data cell 174 stores one bit of a PA in a storage cell 206. The input terminals DL, DL# can write a new value to the storage cell 206 if enabled by a value of logic 1 on DWE input terminal. The lower data cell 174 also has hardware, e.g., logic gates 212, 214, 216, for selecting either the PA bit stored therein or the LA bit from LA0 or LA1 input ports for transmission to the corresponding read output port RD0 or RD1.

Still referring to FIG. 7B, the lower data cell 175 performs the selection between a LA bit received from the lines 52 and the PA bit stored therein in parallel with translation of the page LA. Two input ports LA0, LA1 receive a bit of the LA from the line 52. The LA bit received corresponds to the ordered position of the PA bit stored in the storage cell 206. The value of the mask signal on the input terminal PM# determines whether the PA bit from the storage cell 206 or the LA bit from the input ports LA0, LA1 is transmitted to the corresponding read terminal RD0, RD1. If the mask signal has the value of logic 0, the output ports RD0, RD1 receive the logic bit from the corresponding input terminals LA0, LA1. If the mask signal has the value logic 1, the output ports RD0, RD1 receive the PA bit stored in the storage cell 206. NOR gates 214, 216 and AND-gate 212 perform the above-described multiplexing function for which the mask signal acts as a select signal on a select input PM#. The output read output terminals RD0, RD1 receive the selected address bit in response to a match signal of value logic 1 on the corresponding match input terminal MIT0 or MIT1.

Figure 7C:
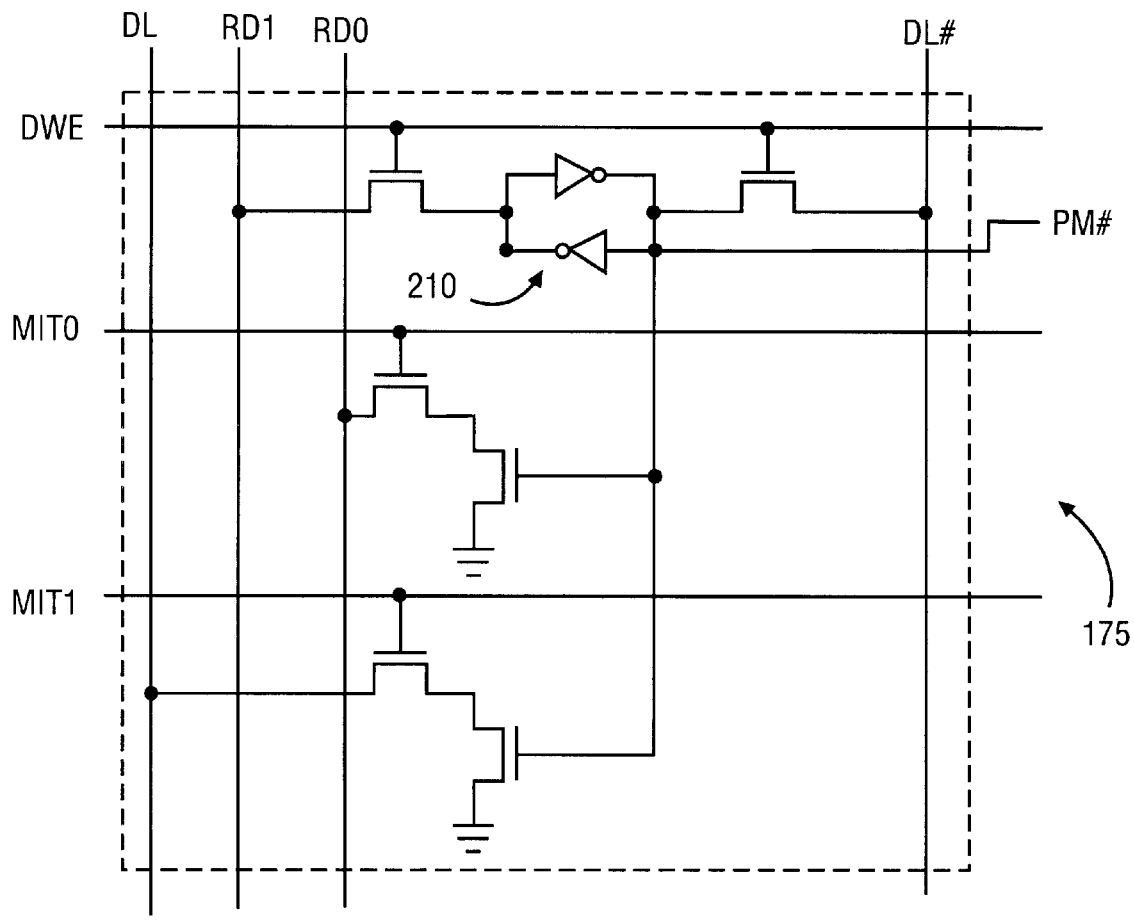
FIG. 7C is a circuit diagram for a double-ported embodiment of the page size mask cell of FIG. 5B.

Still referring to FIG. 7C, the lower data cell 175 performs the multiplexing or selection function of LA and PA bits in parallel with translating a page LA. The parallel multiplexing and "page" address translation can make the generation of PA's in the TLB 42 of FIG. 3A faster than the generation of PA's in a prior art TLB's in which a page LA is first translated and then multiplexed with LA bits, i.e., the method of the TLB 28 of FIG. 2.

FIG. 7C is a circuit diagram of a double-ported embodiment 175 of the page size mask cell 162 of FIG. 5B. The page size mask cell 174 has a storage cell 210 for one mask bit. The output signal from a port PM# of the page size mask cell 162 operates the multiplexing function of the associated lower data cells 158, 159. The page size mask cell 174 may also be read on the lines RD0, RD1 in response to match signals on the lines MIT0, MIT1 by a method similar to the method for reading the upper data cell 173 of FIG. 7A.

Referring to FIGS. 6A and 6B, the use of separate CA and CA# input terminals in the CAM cells 170, 171 affords a method of avoiding storing overlapping page PA's in the CAM locations 68, 70. Applying logic 0 to both the CA1 and the CA1# input terminals insures that the UCM1 output terminal generates a match signal for an logic value stored in the cell 180. Similarly, applying logic 1 to the CA0 and the CA0# input terminals generates a signal of logic 1 on the UCM0 output terminal for any logic value stored in the cell 180. Using this procedure and the purge input terminal of the location valid cell 176 overlapped page addresses can be purged from the TLB CAM array 44 before storing a new page LA therein.

Figure 8A:
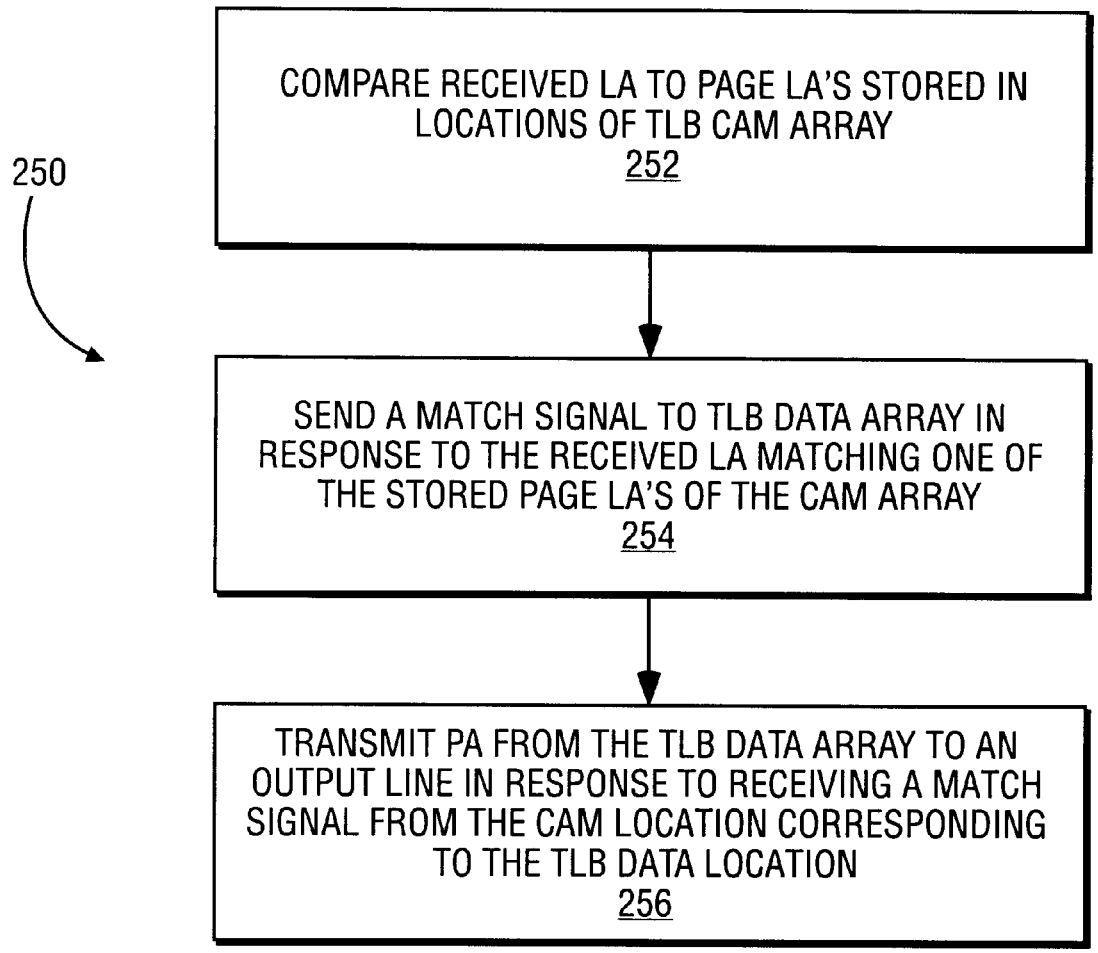
FIG. 8A is a flowchart illustrating steps of a method of translating logical to physical addresses.

FIG. 8A is a flowchart illustrating steps of a method 250 of translating LA's to PA's. At block 252, a received LA is compared to a plurality of page LA's stored in the locations 68, 70 of the TLB CAM array 44. The stored LA's have a plurality of lengths, i.e., a plurality of page sizes. At block 254, a match signal is sent from the TLB CAM array 44 to the TLB data array 46 in response to a portion of the received LA matching one of the page LA's stored in a location 68 of the CAM array 44. The portion's length is equal to the length of the page LA stored in the CAM location 68. At block 256, a PA is transmitted form the TLB data array 46 to an output line, e.g., the line 54 of FIGS. 3A and 3B, in response to receiving the match signal from the CAM location 68 corresponding to the data location 74. A portion of the PA translates the "page LA" containing the received LA; the remaining portion of the PA may be a second portion of the received LA itself.

Figure 8B:
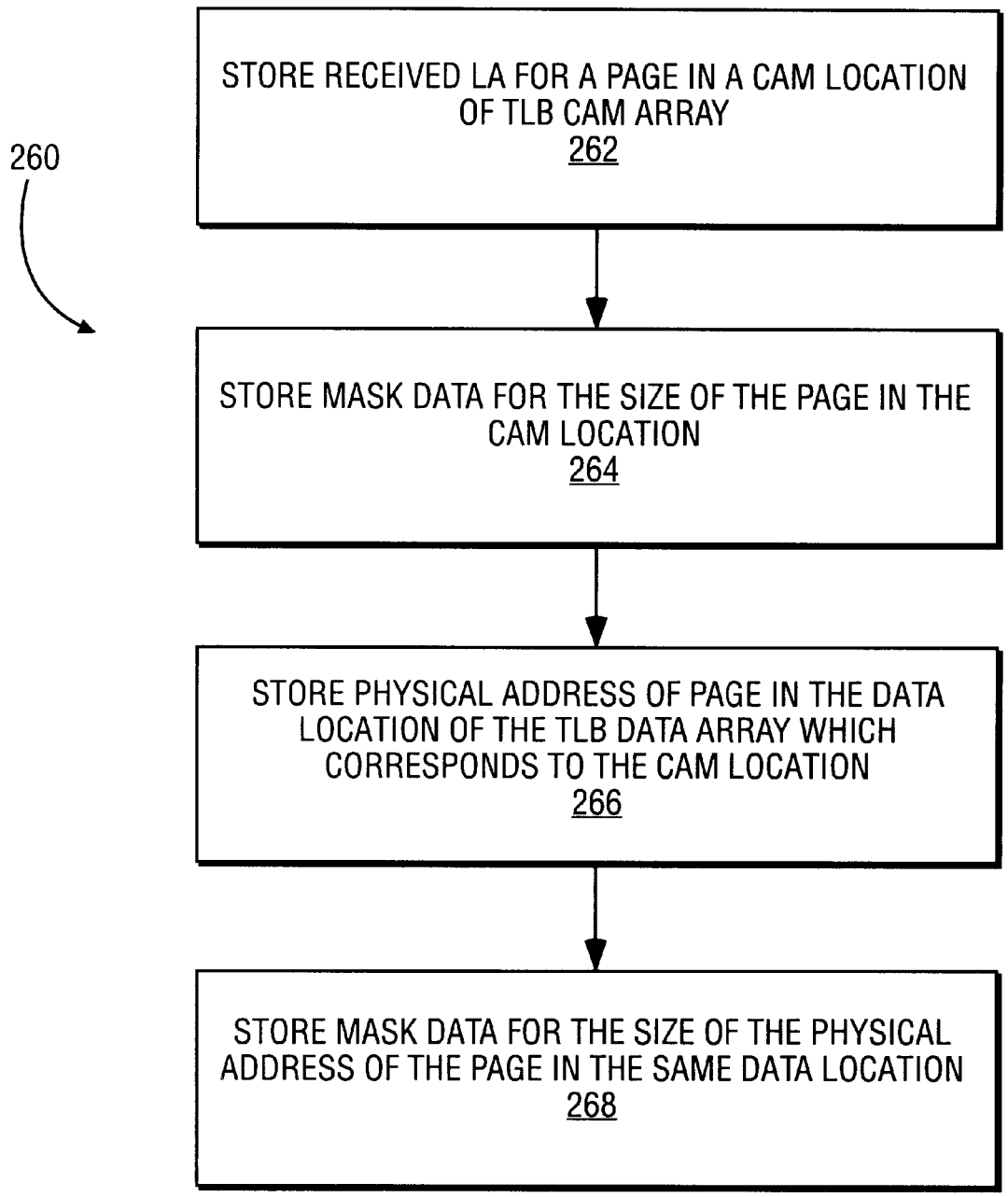
FIG. 8B is a flowchart illustrating steps of a method of storing new addresses to the translation lookaside buffer of FIGS. 3A to 3D.

FIG. 8B is a flowchart illustrating a method 260 of using the translation lookaside buffer 42 of FIGS. 3A to 3D. At block 262, a LA of a page is stored in the CAM location 68 of the TLB CAM array 44 in response to a TLB miss for the LA. At block 264, mask data for the size of the page is stored in one or more of the page size mask cells 132 of the CAM location 68. The mask data unmasks the CAM cells 120, 122 of the CAM location 68 that store the LA of the page stored therein. In some embodiments, the steps of blocks 262 and 264 follow a purge of the TLB CAM array 44 of ranges of LA's stored therein, which overlap the new LA to be stored at block 262. At block 264, a PA of the page whose LA is stored to the CAM location 68 is stored in the data location 72 of TLB data array 46, which corresponds to the CAM location 68. Match signals are sent from TLB CAM locations to corresponding TLB data locations. At block 266, mask data for the size of the PA of the page is stored in the same TLB data location 72.

Still referring to FIG. 8B, overlapping page LA's could occur if the TLB CAM array 44 contains a page LA of the form $Y_0 \ldots Y_K X_{1+K} \ldots X_N$, and the TLB 44 the received LA is for a "bigger" page, i.e., a page LA of the form $Y_0 \ldots Y_K$. To avoid overlapping pages, each time a new LA is written to a CAM location 68, 70, the TLB CAM array is first purged of smaller included pages having the above-described form. The purge step compares the newly received LA to LA's stored in locations 68, 70 of the CAM, and invalidates one of the stored LA's if a portion of the one of the stored LA's matches the new received LA.

For the embodiment 110 of FIGS. 5A and 6A–6D, a purge resets the valid bit of one of the location valid cells 86 to the invalid state if the CAM location 68 stores a LA for a page included in the new page LA to be stored in the TLB CAM array 44. In other words, a range of pages belonging to the page for the new page LA are purged. By applying a signal having the value logic 0 or ground voltage to both the CA and the CA# input terminals of the CAM cells 170, 171, the output terminals UCM, LCM generate match signals. During a purge, a logic 0 signal is applied to both the CA and CA# input terminals of an address range, for includes pages, for all of the CAM locations 68, 70. Simultaneously, a signal of logic 1 is applied to the PG input terminal of all of the location valid cells 86 and a comparison is performed by applying the new page LA to the input line 50 of FIGS. 3A and 3B. The valid bit of pages overlapping the new page LA will be reset to the invalid state by the purge operation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A content addressable memory (CAM), comprising:
    an input port; and
    a plurality of locations to store page addresses to compare to an address received from the input port, each of the plurality of locations comprising:
        a purge input terminal to invalidate an address stored therein in response to both receiving a signal having a first logic value and the address stored therein being an address of a page overlapping a page having the address received from the input port
        a plurality of lower cells to store portions of a page address; and
        at least one page size mask cell to send signals to an associated one of the lower cells, the associated one of the lower cells to produce a match signal in response to either the page size cell sending a mask signal or the portion of the page address stored therein matching a corresponding portion of the address received from the input port; and
    each location to produce a match signal in response to each cell therein producing a match signal.

2. The content addressable memory of claim 1, each location further comprising:
  a plurality of upper cells, each upper cell to generate a match signal in response to a portion of an address stored therein matching a corresponding portion of the address received from the input port.

3. The content addressable memory of claim 1, wherein each lower cell is capable of storing one bit of a page logical address.

4. The content addressable memory of claim 1, wherein the locations form a fully associative CAM memory.

5. The content addressable memory of claim 1, further comprising:
  an output port;
  a data memory having a plurality of data locations to store physical page addresses, each data location corresponding to one of the locations to store page addresses for comparing, each data location to transmit a physical address to the output port in response to receiving a match signal from a corresponding location to store a page address for comparing.

6. The content addressable memory of claim 5, wherein each data location comprises:
  a plurality of lower data cells, each lower data cell comprising a storage cell to store a portion of a physical page address and a multiplexer having first and second data inputs, each storage cell to transmit a portion of the physical page address stored therein to the first data input and the second data input to receive a correspondingly ordered portion of the address from the input port; and
  at least one page size cell to send a page size signal to control a select input terminal of the multiplexer of an associated one of the lower data cells.

7. The content addressable memory of claim 5, wherein each data location further comprises:
  a plurality of upper data cells to store portions of a physical page address, each upper data cell to transmit the portion of the physical page address stored therein to the output line in response to receiving a match signal from the corresponding location for storing a page address for comparing.

8. A data array comprising:
  an input terminal to receive a portion of a logical address;
  an output port; and
  a plurality of data locations to transmit physical addresses to the output port in response to receiving corresponding match signals, each data location comprising:
    at least one lower data cell to store a portion of a physical address and to receive a correspondingly ordered portion of the logical address from the input terminal and a corresponding one of the match signals;
    at least one page size mask cell, a lower data location to transmit the portion of the physical address stored therein to the output port in response to receiving both an activate signal from the page size mask cell and a corresponding match signal and to transmit the portion of the logical address received to the output port in response to receiving both a mask signal from the page size mask cell and the corresponding match signal; and
    a second lower data cell to store a second portion of a physical address and to receive a corresponding portion of the logical address from the input terminal and the corresponding one of the match signals, a second lower data location to transmit the second portion of the physical address stored therein to the output port in response to receiving both an activate signal from a second one of the associated page size mask cells the corresponding one of the match signals and to transmit the portion of the logical address received to the output port in response to receiving both a mask signal from the associated page size mask cell and the corresponding one of the match signals.

9. The data array of claim 8, wherein each particular lower data cell comprises:
  a storage cell for storing a digit of a physical address; and
  a multiplexer having first and second data input terminals and a select input terminal, the first data input terminal to receive the digit from the storage cell and the second input terminal to receive the correspondingly ordered digit of the logical address received by the particular lower data cell, the multiplexer to transmit the signals on the respective first and second data input terminals to the output port in response to receiving the activate and mask signals, respectively, from the page size mask cell.

10. The data array of claim 9, wherein each data location further comprises:
  a plurality of upper data cells to store portions of the physical address and to transmit the portions of the physical address stored therein to the output port in response to receiving the corresponding match signal.

11. The data array of claim 8, wherein a page size mask cell is associated to both the first and the second lower data cells.

12. The data array of claim 8, further comprising a content addressable memory having a plurality of tag locations to store page logical addresses, each tag location to transmit a match signal to the corresponding one of the data locations in response to receiving a logical address on the page of the page logical address stored therein.

13. A method of translating logical to physical addresses for multiple page sizes, comprising:
  comparing an input logical address to a plurality of stored page logical addresses, the stored page addresses having a plurality of lengths;
  sending a match signal to a data array in response to a portion of the input logical address matching one of the stored page logical addresses; and
  transmitting a physical address to an output line in response to the data array receiving a match signal for a corresponding stored page logical address, the physical address having a first portion corresponding to a stored page address producing the match signal and having a second portion corresponding to a remainder of the input logical address after removing a portion of the input logical address that matches the one of the stored page logical addresses.

14. The method of claim 13, wherein the act of transmitting further comprises:
  transmitting a signal for a bit of a stored physical address to a first data input terminal of a multiplexer;
  transmitting a signal for a bit of the logical address to a second data input terminal of a multiplexer;
  selectively transmitting one of the signals at the first and second data input terminals for transmission to the output line in response to a page size mask signal established prior to receipt of the match signal.

15. The method of claim 14, wherein the act of selectively transmitting is completed within less than $10^{-9}$ seconds of the time that the match signal is produced.

16. A method of using a translation lookaside buffer, comprising:

storing a first logical address of a page in a location of a content addressable memory (CAM);

purging a second logical address stored in a location of the CAM in response to a page for the second logical address overlapping the page for the first logical address;

storing mask data for the size of the page in the location;

storing a physical address of the page in a data location of a data array, the data location corresponding to the location of the content addressable memory; and storing mask data for the size of the page in the data location.

17. The method of claim 16, wherein the act of purging includes:

comparing the logical address of the first page to logical addresses stored in locations of the CAM; and invalidating a second logical address stored in the CAM in response to a portion of the second logical address matching the logical address of the first page.

18. The method of claim 16, further comprising:

comparing a location dependent portion of a received logical address for a match with one of the stored logical addresses, the location dependent portion being unmasked by mask data for page size; and sending a match signal to the data array in response to one of the location dependent portions of the received logical address matching a particular one of the logical addresses stored in the CAM; and transmitting a physical address from one of the data locations to an output terminal in response to receiving the match signal from the CAM location corresponding to the one of the data locations.

19. The method of claim 18, wherein the step of transmitting a physical address includes selecting one of a bit of a physical address of the page stored in the one of the data locations and a correspondingly ordered bit of the logical address from the act of storing.

20. The method of claim 19, wherein the act of selecting depends on the value of mask data for the size of the page stored in the one of the data locations.

* * * * *